United States Patent
Kim et al.

(10) Patent No.: US 11,843,932 B2
(45) Date of Patent: *Dec. 12, 2023

(54) SIX DEGREES OF FREEDOM AND THREE DEGREES OF FREEDOM BACKWARD COMPATIBILITY

(71) Applicant: QUALCOMM Incorporated, San Diego, CA (US)

(72) Inventors: Moo Young Kim, San Diego, CA (US); Nils Günther Peters, San Diego, CA (US); S M Akramus Salehin, San Diego, CA (US); Siddhartha Goutham Swaminathan, San Diego, CA (US); Dipanjan Sen, Dublin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

This patent is subject to a terminal disclaimer.

(21) Appl. No.: 17/329,120

(22) Filed: May 24, 2021

(65) Prior Publication Data

US 2021/0281967 A1 Sep. 9, 2021

Related U.S. Application Data

(63) Continuation of application No. 16/567,700, filed on Sep. 11, 2019, now Pat. No. 11,019,449.

(Continued)

(51) Int. Cl.
*H04S 7/00* (2006.01)
*G06T 19/00* (2011.01)
(Continued)

(52) U.S. Cl.
CPC .............. *H04S 7/304* (2013.01); *G06F 3/012* (2013.01); *G06F 3/0346* (2013.01);
(Continued)

(58) Field of Classification Search
CPC ..... G10L 19/008; G10L 19/167; G10L 19/00; G10L 25/48; G06F 3/165; G06F 3/162;
(Continued)

(56) References Cited

U.S. PATENT DOCUMENTS 9,591,427 B1  3/2017  Lyren et al.
10,070,094 B2  9/2018  Peters et al.
(Continued)

FOREIGN PATENT DOCUMENTS

WO  2017066300 A2  4/2017
WO  2018064296 A1  4/2018
WO  2019075425  4/2019

OTHER PUBLICATIONS

Audio: "Call for Proposals for 3D Audio", International Organisation for Standardisation Organisation Internationale De Normalisation, ISO/IEC JTC1/SC29/WG11, Coding of Moving Pictures and Audio, ISO/IEC JTC1/SC29/WG11/N13411, Geneva, Jan. 2013, pp. 1-20.

(Continued)

*Primary Examiner* — Alexander Krzystan
(74) *Attorney, Agent, or Firm* — QUALCOMM Incorporated

(57) ABSTRACT

A device and method for backward compatibility for virtual reality (VR), mixed reality (MR), augmented reality (AR), computer vision, and graphics systems. The device and method enable rendering audio data with more degrees of freedom on devices that support fewer degrees of freedom. The device includes memory configured to store audio data representative of a soundfield captured at a plurality of capture locations, metadata that enables the audio data to be rendered to support N degrees of freedom, and adaptation metadata that enables the audio data to be rendered to support M degrees of freedom. The device also includes one or more processors coupled to the memory, and configured (Continued)

to adapt, based on the adaptation metadata, the audio data to provide the M degrees of freedom, and generate speaker feeds based on the adapted audio data.

23 Claims, 17 Drawing Sheets

Related U.S. Application Data

(60) Provisional application No. 62/742,324, filed on Oct. 6, 2018.

(51) Int. Cl.
*G06F 3/0346* (2013.01)
*H04W 4/029* (2018.01)
*H04W 4/02* (2018.01)
*G06F 3/01* (2006.01)
*G06V 20/20* (2022.01)

(52) U.S. Cl.
CPC ............ *G06T 19/006* (2013.01); *G06V 20/20* (2022.01); *H04W 4/027* (2013.01); *H04W 4/029* (2018.02); *H04S 2420/01* (2013.01)

(58) Field of Classification Search
CPC .......... G06F 3/16; G06F 16/683; G06F 16/40; G11B 20/10527
USPC ....................................... 381/22, 23; 700/94
See application file for complete search history.

(56) References Cited

U.S. PATENT DOCUMENTS

| | | | |
|---|---|---|---|
| 10,405,126 | B2 | 9/2019 | Peters et al. |
| 11,019,449 | B2 | 5/2021 | Kim et al. |
| 2003/0227476 | A1 | 12/2003 | Wilcock et al. |
| 2008/0130904 | A1 | 6/2008 | Faller |
| 2011/0249821 | A1 | 10/2011 | Jaillet et al. |
| 2013/0202129 | A1 | 8/2013 | Kraemer et al. |
| 2014/0168277 | A1 | 6/2014 | Ashley et al. |
| 2015/0070274 | A1 | 3/2015 | Morozov |
| 2016/0225377 | A1 | 8/2016 | Miyasaka et al. |
| 2016/0227340 | A1 | 8/2016 | Peters |
| 2017/0047071 | A1 | 2/2017 | Melkote et al. |
| 2017/0078825 | A1 | 3/2017 | Mangiat et al. |
| 2017/0180905 | A1 | 6/2017 | Purnhagen et al. |
| 2017/0295446 | A1 | 10/2017 | Thagadur Shivappa |
| 2018/0046431 | A1 | 2/2018 | Thagadur Shivappa et al. |
| 2018/0068664 | A1 | 3/2018 | Seo et al. |
| 2018/0091917 | A1 | 3/2018 | Chon et al. |
| 2018/0139565 | A1 | 5/2018 | Norris et al. |
| 2018/0217806 | A1 | 8/2018 | Jang |
| 2018/0249274 | A1 | 8/2018 | Yren et al. |
| 2018/0288558 | A1 | 10/2018 | Umminger, III et al. |
| 2019/0230436 | A1 | 7/2019 | Tsingos et al. |
| 2019/0253691 | A1 | 8/2019 | Ostrover et al. |
| 2019/0306651 | A1 | 10/2019 | Vilermo et al. |
| 2019/0313200 | A1 | 10/2019 | Stein |
| 2019/0379876 | A1 | 12/2019 | Hur et al. |
| 2019/0387350 | A1 | 12/2019 | Audfray et al. |
| 2020/0037091 | A1* | 1/2020 | Jeon ......................... H04S 7/306 |
| 2020/0053464 | A1* | 2/2020 | Peters ...................... H04S 7/304 |
| 2020/0094141 | A1 | 3/2020 | Fersch et al. |
| 2020/0145776 | A1* | 5/2020 | Herre .................... G10L 19/008 |
| 2020/0145778 | A1 | 5/2020 | Laaksonen et al. |
| 2020/0162833 | A1* | 5/2020 | Lee ........................... H04R 5/02 |
| 2020/0211574 | A1 | 7/2020 | Lee et al. |
| 2020/0228913 | A1* | 7/2020 | Herre ................... G10L 21/0272 |
| 2020/0260206 | A1 | 8/2020 | Vilkamo et al. |

OTHER PUBLICATIONS

ETSI TS 103 589 V1.1.1, "Higher Order Ambisonics (HOA) Transport Format", Jun. 2018, 33 pages.
Herre J., et al., "MPEG-H 3D Audio—The New Standard for Coding of Immersive Spatial Audio", IEEE Journal of Selected Topics in Signal Processing, vol. 9, No. 5, Aug. 1, 2015 (Aug. 1, 2015), XP055243182, pp. 770-779, US ISSN: 1932-4553, DOI: 10.1109/JSTSP.2015.2411578.
Hollerweger F., "An Introduction to Higher Order Ambisonic", Oct. 2008, pp. 1-13, Accessed online [Jul. 8, 2013].
"Information Technology—High Efficiency Coding and Media Delivery in Heterogeneous Environments—Part 3: 3D Audio", ISO/IEC JTC 1/SC 29, ISO/IEC DIS 23008-3, Jul. 25, 2014, 433 Pages.
"Information Technology—High Efficiency Coding and Media Delivery in Heterogeneous Environments—Part 3: 3D Audio", ISO/IEC JTC 1/SC 29/WG11, ISO/IEC 23008-3, 201x(E), Oct. 12, 2016, 797 Pages.
"Information Technology—High Efficiency Coding and Media Delivery in Heterogeneous Environments—Part 3: Part 3: 3D Audio, Amendment 3: MPEG-H 3D Audio Phase 2," ISO/IEC JTC 1/SC 29N, ISO/IEC 23008-3:2015/PDAM 3, Jul. 25, 2015, 208 Pages.
International Search Report and Written Opinion—PCT/US2019/050824—ISA/EPO—dated Dec. 20, 2019.
ISO/IEC/JTC: "ISO/IEC JTC 1/SC 29 N ISO/IEC CD 23008-3 Information Technology—High Efficiency Coding and Media Delivery in Heterogeneous Environments—Part 3: 3D Audio", Apr. 4, 2014 (Apr. 4, 2014), 337 Pages, XP055206371, Retrieved from the Internet: URL:http://www.iso.org/iso/iso_catalogue/catalogue_tc/catalogue_tc_browse.htm?commid=45316 [retrieved on Aug. 5, 2015].
Peterson J., et al., "Virtual Reality, Augmented Reality, and Mixed Reality Definitions", EMA, version 1.0, Jul. 7, 2017, 4 Pages.
Poletti M.A., "Three-Dimensional Surround Sound Systems Based on Spherical Harmonics", The Journal of the Audio Engineering Society, vol. 53, No. 11, Nov. 2005, pp. 1004-1025.
Schonefeld V., "Spherical Harmonics", Jul. 1, 2005, XP002599101, 25 Pages, Accessed online [Jul. 9, 2013] at URL:http://heim.c-otto.de/~volker/prosem_paper.pdf.
Sen D., et al., "RM1-HOA Working Draft Text", 107. MPEG Meeting, Jan. 13, 2014-Jan. 17, 2014, San Jose, (Motion Picture Expert Group or ISO/IEC JTC1/SC29/WG11), No. M31827, Jan. 11, 2014 (Jan. 11, 2014), San Jose, USA, XP030060280, 83 Pages, p. 11, paragraph 5.2.4-paragraph 5.2.5 p. 16, paragraph 6.1.10—p. 17; Figure 4 p. 18, paragraph 6.3—p. 22, Paragraph 6.3.2.2 p. 64, paragraph B. 1—p. 66, Paragraph B.2.1; figures B.1, B.2 p. 70, paragraph B.2.1.3—p. 71 p. 74, paragraph B.2.4.1—p. 75, Paragraph B.2.4.2.
Sen D., et al., "Technical Description of the Qualcomm's HoA Coding Technology for Phase II", 109th MPEG Meeting, Jul. 7, 2014- Nov. 7, 2014, Sapporo, (Motion Picture Expert Group or ISO/IEC JTC1/SC29/WG11), No. M34104, Jul. 2, 2014 (Jul. 2, 2014), XP030062477, 4 Pages, figure 1.
Tylka J.G., et al., "Comparison of Techniques for Binaural Navigation of Higher-Order Ambisonic Soundfields", AES Convention 139; Oct. 2015, AES, 60 East 42nd Street, Room 2520, New York 10165-2520, USA, Oct. 23, 2015 (Oct. 23, 2015), 13 Pages, XP040672273, the whole document.
Prosecution History from U.S. Appl. No. 01/184,774, dated Sep. 22, 2020 through Apr. 7, 2021, 33 pp.

\* cited by examiner

SIX DEGREES OF FREEDOM AND THREE DEGREES OF FREEDOM BACKWARD COMPATIBILITY

CLAIM OF PRIORITY UNDER 35 U.S.C. § 119

This application is a Continuation of U.S. Non-Provisional application Ser. No. 16/567,700 filed on Sep. 11, 2019, entitled "SIX DEGREES OF FREEDOM AND THREE DEGREES OF FREEDOM BACKWARD COMPATIBILITY", which claims under 35 USC § 119 the benefit of and priority to U.S. Provisional Application 62/742,324 filed Oct. 6, 2018, entitled "SIX DEGREES OF FREEDOM AND THREE DEGREES OF FREEDOM BACKWARD COMPATIBILITY", the entire content of which is hereby incorporated by reference. The disclosure of the prior Application is considered part of and is incorporated by reference into this Patent Application.

TECHNICAL FIELD

This disclosure relates to processing of media data, such as audio data.

BACKGROUND

In recent years, there is an increasing interest in Augmented Reality (AR), Virtual Reality (VR), and Mixed Reality (MR) technologies. Advances to image processing and computer vision technologies in the wireless space, have led to better rendering and computational resources allocated to improving the visual quality and immersive visual experience of these technologies.

In VR technologies, virtual information may be presented to a user using a head-mounted display such that the user may visually experience an artificial world on a screen in front of their eyes. In AR technologies, the real-world is augmented by visual objects that are super-imposed, or, overlaid on physical objects in the real-world. The augmentation may insert new visual objects or mask visual objects to the real-world environment. In MR technologies, the boundary between what's real or synthetic/virtual and visually experienced by a user is becoming difficult to discern.

SUMMARY

This disclosure relates generally to auditory aspects of the user experience of computer-mediated reality systems, including virtual reality (VR), mixed reality (MR), augmented reality (AR), computer vision, and graphics systems. More specifically, the techniques may enable rendering of audio data for VR, MR, AR, etc. that accounts for five or more degrees of freedom on devices or systems that support fewer than five degrees of freedom. As one example, the techniques may enable rendering of audio data that accounts for six degrees of freedom (yaw, pitch, and roll plus x, y, and z translation of the user in space) on devices or systems that only support three degrees of freedom (yaw, pitch, and roll) in terms of head movements or on devices or systems that support zero degrees of freedom.

In one example, a device comprises a memory configured to store audio data representative of a soundfield captured at a plurality of capture locations, metadata that enables the audio data to be rendered to support N degrees of freedom, and adaptation metadata that enables the audio data to be rendered to support M degrees of freedom, wherein N is a first integer number and M is a second integer number that is different than the first integer number, and one or more a processors coupled to the memory, and configured to: adapt, based on the adaptation metadata, the audio data to provide the M degrees of freedom; and generate speaker feeds based on the adapted audio data.

In another example, a method comprises storing audio data representative of a soundfield captured at a plurality of capture locations, storing metadata that enables the audio data to be rendered to support N degrees of freedom, storing adaptation metadata that enables the audio data to be rendered to support M degrees of freedom, wherein N is a first integer number and M is a second integer number that is different than the first integer number, adapting, based on the adaptation metadata, the audio data to provide the M degrees of freedom, and generating speaker feeds based on the adapted audio data.

In yet another example, a device comprises means for storing audio data representative of a soundfield captured at a plurality of capture locations, means for storing metadata that enables the audio data to be rendered to support N degrees of freedom, means for storing adaptation metadata that enables the audio data to be rendered to support M degrees of freedom, wherein N is a first integer number and M is a second integer number that is different than the first integer number, means for adapting, based on the adaptation metadata, the audio data to provide the M degrees of freedom, and means for generating speaker feeds based on the adapted audio data.

The details of one or more examples of this disclosure are set forth in the accompanying drawings and the description below. Other features, objects, and advantages of various aspects of the techniques will be apparent from the description and drawings, and from the claims.

DETAILED DESCRIPTION

Figure 1:
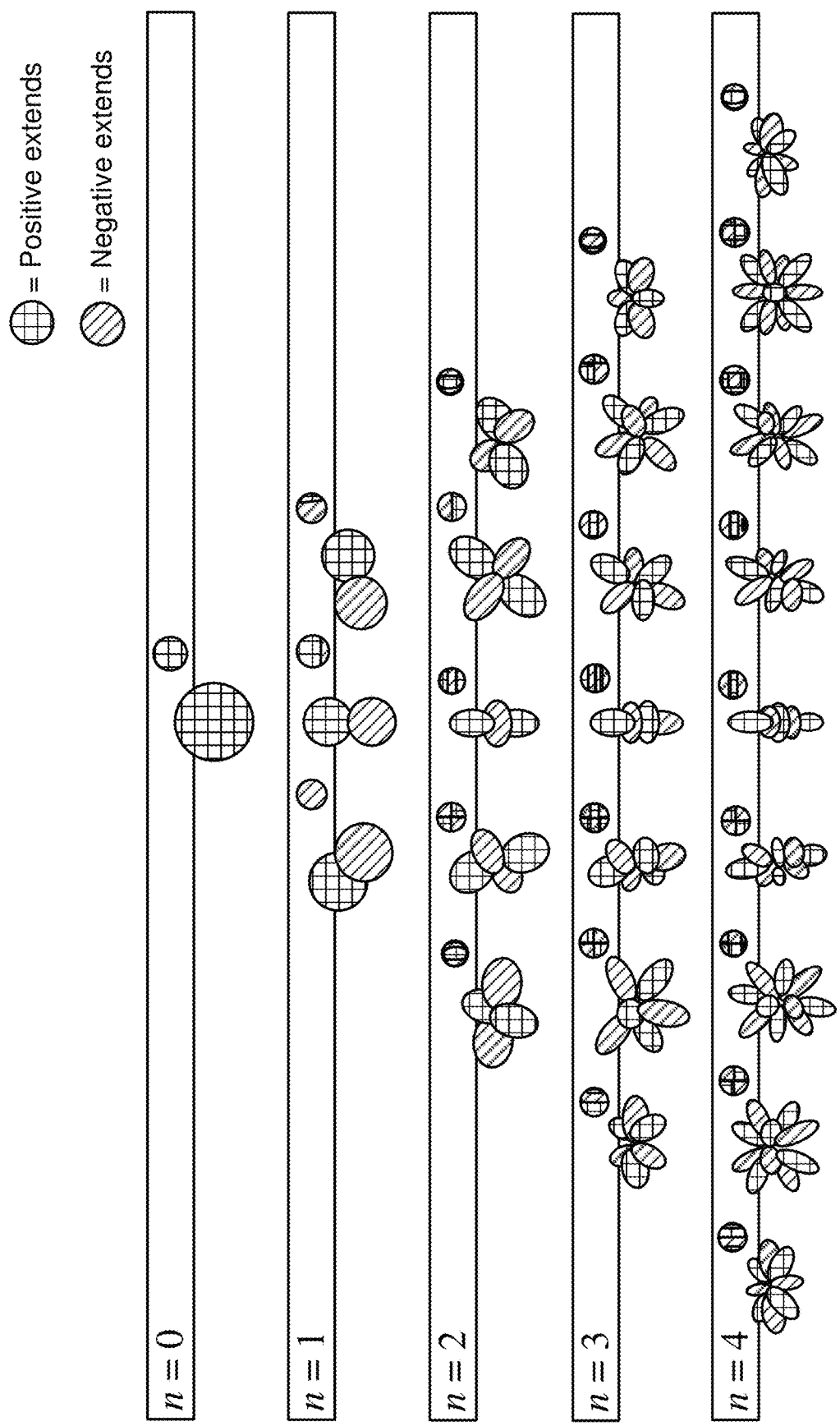
FIG. 1 is a diagram illustrating spherical harmonic basis functions of various orders and sub-orders.

Particular implementations of the present disclosure are described below with reference to the drawings. In the description, common features are designated by common reference numbers throughout the drawings. As used herein, various terminology is used for the purpose of describing particular implementations only and is not intended to be limiting. For example, the singular forms "a,", "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, "integrated" may include "manufactured or sold with". A device may be integrated if a user buys a package that bundles or includes the device as part of the package. In some descriptions, two devices may be coupled, but not necessarily integrated (e.g., different peripheral devices may not be integrated to a command device, but still may be "coupled"). Another example may be that any of the transceivers or antennas described herein that may be "coupled" to a processor, but not necessarily part of the package that includes an AR, VR or MR device. Other examples may be inferred from the context disclosed herein, including this paragraph, when using the term "integrated".

As used herein "a wireless" connection between devices may be based on various wireless technologies, such as Bluetooth, Wireless-Fidelity (Wi-Fi) or variants of Wi-Fi (e.g. Wi-Fi Direct. Devices may be "wirelessly connected" based on different cellular communication systems, such as, a Long-Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. In addition, when two devices are within line of sight, a "wireless connection" may also be based on other wireless technologies, such as ultrasound, infrared, pulse radio frequency electromagnetic energy, structured light, or directional of arrival techniques used in signal processing (e.g. audio signal processing or radio frequency processing).

As used herein A "and/or" B may mean that either "A and B", or "A or B", or both "A and B" and "A or B" are applicable or acceptable.

The term "computing device" is used generically herein to refer to any one or all of servers, personal computers, laptop computers, tablet computers, mobile devices, cellular telephones, smartbooks, ultrabooks, palm-top computers, personal data assistants (PDA's), wireless electronic mail receivers, multimedia Internet-enabled cellular telephones, Global Positioning System (GPS) receivers, wireless gaming controllers, and similar electronic devices which include a programmable processor and circuitry for wirelessly sending and/or receiving information.

There are various 'surround-sound' channel-based formats in the market, ranging, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce the soundtrack for a movie once and not spend effort to remix the soundtrack for each potential speaker configuration. A Moving Pictures Expert Group (MPEG) has released a standard allowing for soundfields to be represented using a hierarchical set of elements (e.g., Higher-Order Ambisonic—HOA—coefficients) that can be rendered to speaker feeds for most speaker configurations, including 5.1 and 22.2 configuration whether in location defined by various standards or in non-uniform locations.

MPEG released the standard as MPEG-H 3D Audio standard, formally entitled "Information technology—High efficiency coding and media delivery in heterogeneous environments—Part 3: 3D audio," set forth by ISO/IEC JTC 1/SC 29, with document identifier ISO/IEC DIS 23008-3, and dated Jul. 25, 2014. MPEG also released a second edition of the 3D Audio standard, entitled "Information technology—High efficiency coding and media delivery in heterogeneous environments—Part 3: 3D audio, set forth by ISO/IEC JTC 1/SC 29, with document identifier ISO/IEC 23008-3:201x(E), and dated Oct. 12, 2016. Reference to the "3D Audio standard" in this disclosure may refer to one or both of the above standards.

As noted above, one example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty}\left[4\pi\sum_{n=0}^{\infty}j_n(kr_r)\sum_{m=-n}^{n}A_n^m(k)Y_n^m(\theta_r, \varphi_r)\right]e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $k = \frac{\omega}{c}$, c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (i.e., $S(\omega, r_r, \theta_r, \Phi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

FIG. 1 is a diagram illustrating spherical harmonic basis functions from the zero order (n=0) to the fourth order (n=4). As can be seen, for each order, there is an expansion of suborders m which are shown but not explicitly noted in the example of FIG. 1 for ease of illustration purposes.

The SHC $A_n^m(k)$ can either be physically acquired (e.g., recorded) by various microphone array configurations or, alternatively, they can be derived from channel-based or object-based descriptions of the soundfield. The SHC (which also may be referred to as higher order ambisonic—HOA—coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $A_n^m(k)$ for the soundfield corresponding to an individual audio object may be expressed as:

$$A_n^m(k) = g(\omega)(-4\pi i k)h_n^{(2)}(kr_s)Y_n^{m*}(\theta_s, \varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy g(w) as a function of frequency (e.g., using time-frequency analysis techniques, such as performing a fast Fourier transform on the PCM stream) allows us to convert each PCM object and the corresponding location into the SHC $A_n^m(k)$. Further, it can be shown (since the above is a linear and orthogonal decomposition) that the $A_n^m(k)$ coefficients for each object are additive. In this manner, a number of PCM objects can be represented by the $A_n^m(k)$ coefficients (e.g., as a sum of the coefficient vectors for the individual objects). Essentially, the coefficients contain information about the soundfield (the pressure as a function of 3D coordinates), and the above represents the transformation from individual objects to a representation of the overall soundfield, in the vicinity of the observation point $\{r_r, \theta_r, \varphi_r\}$. The remaining figures are described below in the context of SHC-based audio coding.

Figure 2A:
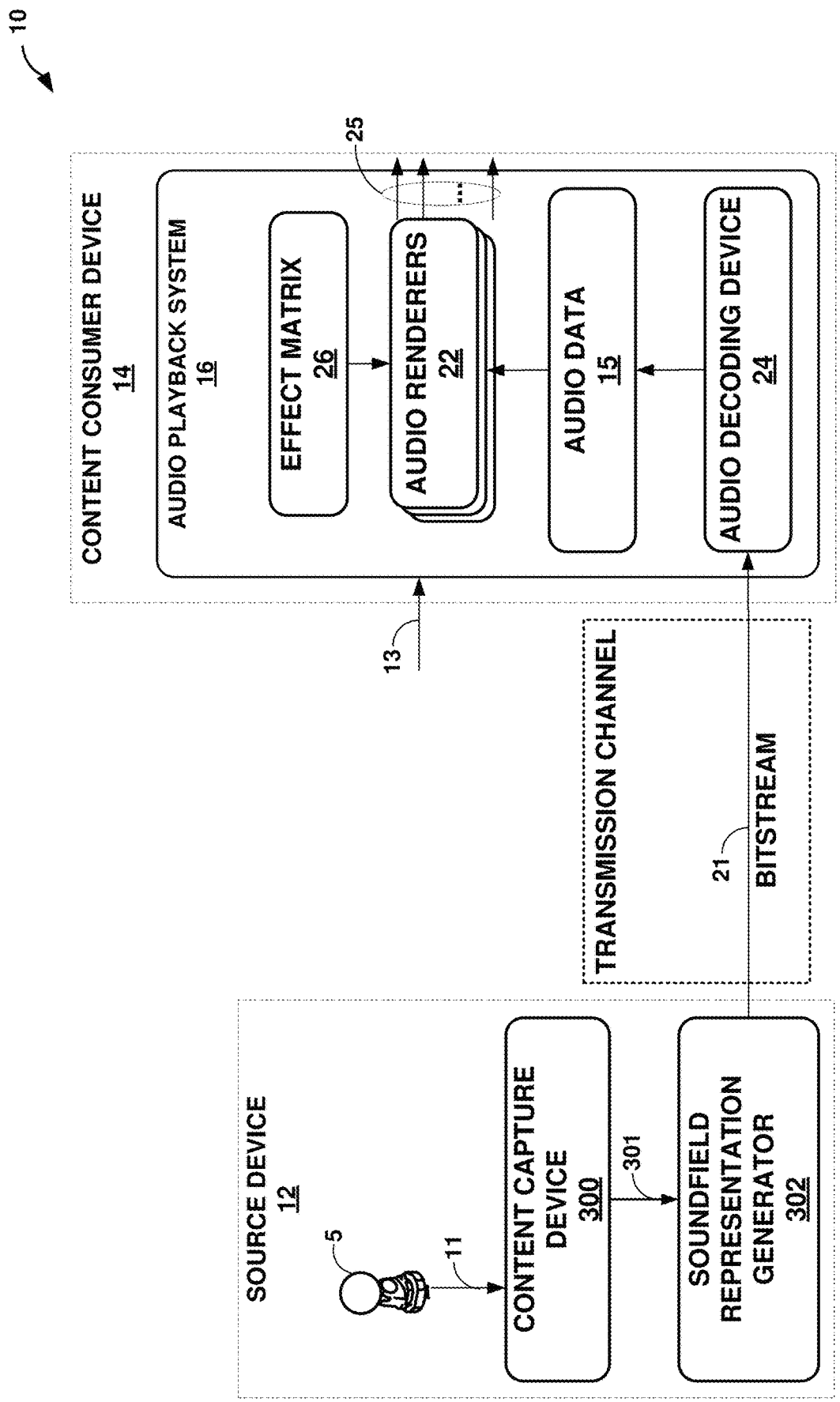
FIGS. 2A and 2B are diagrams illustrating systems that may perform various aspects of the techniques described in this disclosure.
Figure 2B:
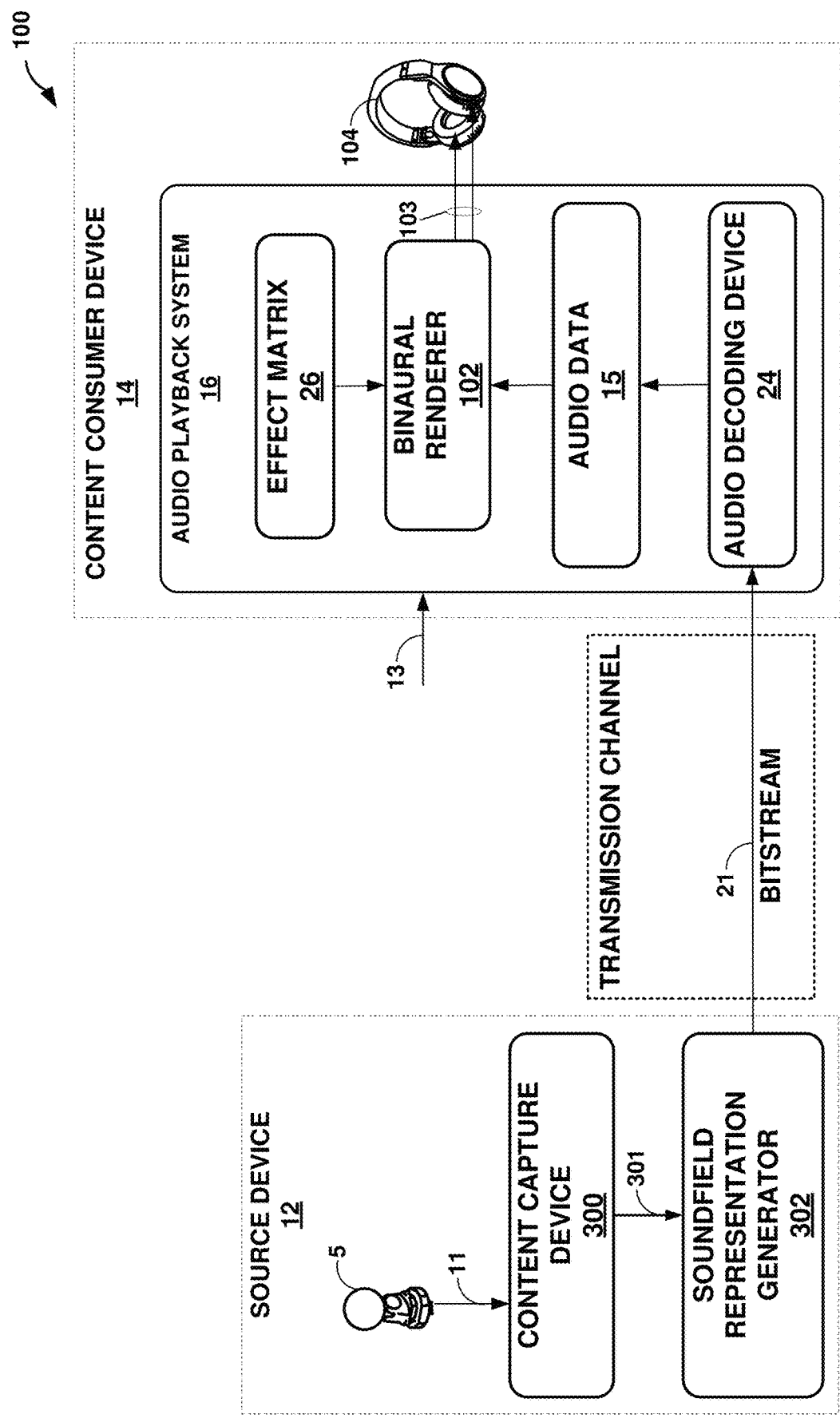

FIGS. 2A and 2B are diagrams illustrating systems that may perform various aspects of the techniques described in this disclosure. As shown in the example of FIG. 2A, system 10 includes a source device 12 and a content consumer device 14. While described in the context of the source device 12 and the content consumer device 14, the techniques may be implemented in any context in which any representation of a soundfield (including scene-based audio data—such as HOA coefficients, object-based audio data, and channel-based audio data) is encoded to form a bitstream representative of the audio data.

Moreover, the source device 12 may represent any form of computing device capable of generating a representation of a soundfield. Source device 12 is generally described herein in the context of being a VR content creator device although source device 12 may take other forms. Likewise, the content consumer device 14 may represent any form of computing device capable of implementing the techniques described in this disclosure as well as audio playback. Content consumer device 14 is generally described herein in the context of being a VR client device but may take other forms.

The source device 12 may be operated by an entertainment company or other entity that generates multi-channel audio content for consumption by operators of content consumer devices, such as the content consumer device 14. In many VR scenarios, the source device 12 generates audio content in conjunction with video content. The source device 12 includes a content capture device 300 and a content capture assistant device 302. The content capture device 300 may be configured to interface or otherwise communicate with a microphone 5. The microphone 5 may represent an Eigenmike® or other type of 3D audio microphone capable of capturing and representing the soundfield as audio data 11.

The content capture device 300 may, in some examples, include an integrated microphone 5 that is integrated into the housing of the content capture device 300. The content capture device 300 may interface wirelessly or via a wired connection with the microphone 5. Rather than capture, or in conjunction with capturing, audio data via microphone 5, the content capture device 300 may process the audio data 11 after the audio data 11 are input via some type of removable storage, wirelessly and/or via wired input processes. As such, various combinations of the content capture device 300 and the microphone 5 are possible in accordance with this disclosure.

The content capture device 300 may also be configured to interface or otherwise communicate with the soundfield representation generator 302. The soundfield representation generator 302 may include any type of hardware device capable of interfacing with the content capture device 300. The soundfield representation generator 302 may the use audio data 11 provided by the content capture device 300 to generate various representations of the same soundfield represented by the audio data 11. For instance, to generate the different representations of the soundfield using the audio data 11, soundfield representation generator 302 may use a coding scheme for ambisonic representations of a soundfield, referred to as Mixed Order Ambisonics (MOA)

as discussed in more detail in U.S. Pat. No. 10,405,126, entitled "MIXED-ORDER AMBISONICS (MOA) AUDIO DATA FOR COMPUTER-MEDIATED REALITY SYSTEMS," filed on Aug. 8, 2017, and granted on Sep. 3, 2019.

To generate a particular MOA representation of the soundfield, the soundfield representation generator 302 may generate a partial subset of a full set of HOA coefficients. For instance, each MOA representation generated by the soundfield representation generator 302 may provide precision with respect to some areas of the soundfield, but less precision in other areas. In one example, an MOA representation of the soundfield may include eight (8) uncompressed HOA coefficients, while the third order HOA representation of the same soundfield may include sixteen (16) uncompressed HOA coefficients. As such, each MOA representation of the soundfield that is generated as a partial subset of the HOA coefficients may be less storage-intensive and less bandwidth intensive (if and when transmitted as part of the bitstream 21 over the illustrated transmission channel) than the corresponding third order HOA representation of the same soundfield generated from the HOA coefficients.

Although described with respect to MOA representations, the techniques of this disclosure may also be performed with respect to full-order ambisonic (FOA) representations in which all of the HOA coefficients for a given order N are used to represent the soundfield. In other words, rather than represent the soundfield using a partial, non-zero subset of the audio data 11, the soundfield representation generator 302 may represent the soundfield using all of the audio data 11 for a given order N, resulting in a total of HOA coefficients equaling $(N+1)^2$.

In this respect, the higher order ambisonic audio data 11 may include higher order ambisonic coefficients 11 associated with spherical basis functions having an order of one or less (which may be referred to as "$1^{st}$ order ambisonic audio data 11"), higher order ambisonic coefficients associated with spherical basis functions having a mixed order and suborder (which may be referred to as the "MOA representation" discussed above), or higher order ambisonic coefficients associated with spherical basis functions having an order greater than one (which is referred to above as the "FOA representation").

The content capture device 300 may, in some examples, be configured to wirelessly communicate with the soundfield representation generator 302. In some examples, the content capture device 300 may communicate, via one or both of a wireless connection or a wired connection, with the soundfield representation generator 302. Via the connection between the content capture device 300 and the soundfield representation generator 302, the content capture device 300 may provide content in various forms of content, which, for purposes of discussion, are described herein as being portions of the audio data 11.

In some examples, the content capture device 300 may leverage various aspects of the soundfield representation generator 302 (in terms of hardware or software capabilities of the soundfield representation generator 302). For example, the soundfield representation generator 302 may include dedicated hardware configured to (or specialized software that when executed causes one or more processors to) perform psychoacoustic audio encoding (such as a unified speech and audio coder denoted as "USAC" set forth by the Motion Picture Experts Group (MPEG) or the MPEG-H 3D audio coding standard). The content capture device 300 may not include the psychoacoustic audio encoder dedicated hardware or specialized software and instead provide audio aspects of the content 301 in a non-psychoacoustic-audio-coded form. The soundfield representation generator 302 may assist in the capture of content 301 by, at least in part, performing psychoacoustic audio encoding with respect to the audio aspects of the content 301.

The soundfield representation generator 302 may also assist in content capture and transmission by generating one or more bitstreams 21 based, at least in part, on the audio content (e.g., MOA representations and/or third order HOA representations) generated from the audio data 11. The bitstream 21 may represent a compressed version of the audio data 11 and any other different types of the content 301 (such as a compressed version of spherical video data, image data, or text data).

The soundfield representation generator 302 may generate the bitstream 21 for transmission, as one example, across a transmission channel, which may be a wired or wireless channel, a data storage device, or the like. The bitstream 21 may represent an encoded version of the audio data 11 and may include a primary bitstream and another side bitstream, which may be referred to as side channel information. In some instances, the bitstream 21 representing the compressed version of the audio data may conform to bitstreams produced in accordance with the MPEG-H 3D audio coding standard.

The content consumer device 14 may be operated by an individual and may represent a VR client device. Although described with respect to a VR client device, content consumer device 14 may represent other types of devices, such as an augmented reality (AR) client device, a mixed reality (MR) client device, a standard computer, a headset, headphones, or any other device capable of tracking head movements and/or general translational movements of the individual operating the client consumer device 14. As shown in the example of FIG. 2A, the content consumer device 14 includes an audio playback system 16, which may refer to any form of audio playback system capable of rendering audio data, including one or more of SHC (whether in form of third order HOA representations and/or MOA representations), audio objects, and audio channels, for playback as multi-channel audio content.

While shown in FIG. 2A as being directly transmitted to the content consumer device 14, the source device 12 may output the bitstream 21 to an intermediate device positioned between the source device 12 and the content consumer device 14. The intermediate device may store the bitstream 21 for later delivery to the content consumer device 14, which may request the bitstream. The intermediate device may comprise a file server, a web server, a desktop computer, a laptop computer, a tablet computer, a mobile phone, a smart phone, or any other device capable of storing the bitstream 21 for later retrieval by an audio decoder. The intermediate device may reside in a content delivery network capable of streaming the bitstream 21 (and possibly in conjunction with transmitting a corresponding video data bitstream) to subscribers, such as the content consumer device 14, requesting the bitstream 21.

Alternatively, the source device 12 may store the bitstream 21 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content stored to the mediums are transmitted (and may include retail stores and other store-based delivery mechanism). In any event, the techniques of this disclosure should not therefore be limited in this respect to the example of FIG. 2A.

As noted above, the content consumer device 14 includes the audio playback system 16. The audio playback system 16 may represent any system capable of playing back channel-based audio data. The audio playback system 16 may include a number of different renderers 22. The renderers 22 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

The audio playback system 16 may further include an audio decoding device 24. The audio decoding device 24 may represent a device configured to decode bitstream 21 to output audio data 15 (which again, as one example, may include HOA that form the full third order HOA representation or a subset thereof that forms an MOA representation of the same soundfield or decompositions thereof, such as the predominant audio signal, ambient HOA coefficients, and the vector based signal described in the MPEG-H 3D Audio Coding Standard). As such, the audio data 15 may be similar to a full set or a partial subset of HOA coefficients, but may differ due to lossy operations (e.g., quantization) and/or transmission via the transmission channel. The audio playback system 16 may, after decoding the bitstream 21 to obtain the audio data 15, render the audio data 15 to output speaker feeds 25. The speaker feeds 25 may drive one or more speakers (which are not shown in the example of FIG. 2A for ease of illustration purposes). Ambisonic representations of a soundfield may be normalized in a number of ways, including N3D, SN3D, FuMa, N2D, or SN2D.

To select the appropriate renderer or, in some instances, generate an appropriate renderer, the audio playback system 16 may obtain loudspeaker information 13 indicative of a number of loudspeakers and/or a spatial geometry of the loudspeakers. In some instances, the audio playback system 16 may obtain the loudspeaker information 13 using a reference microphone and driving the loudspeakers in such a manner as to dynamically determine the loudspeaker information 13. In other instances, or in conjunction with the dynamic determination of the loudspeaker information 13, the audio playback system 16 may prompt a user to interface with the audio playback system 16 and input the loudspeaker information 13.

The audio playback system 16 may select one of the audio renderers 22 based on the loudspeaker information 13. In some instances, the audio playback system 16 may, when none of the audio renderers 22 are within some threshold similarity measure (in terms of the loudspeaker geometry) to the loudspeaker geometry specified in the loudspeaker information 13, generate the one of audio renderers 22 based on the loudspeaker information 13. The audio playback system 16 may, in some instances, generate one of the audio renderers 22 based on the loudspeaker information 13 without first attempting to select an existing one of the audio renderers 22.

When outputting the speaker feeds 25 to headphones, the audio playback system 16 may utilize one of the renderers 22 that provides for binaural rendering using head-related transfer functions (HRTF) or other functions capable of rendering to left and right speaker feeds 25 for headphone speaker playback. The terms "speakers" or "transducer" may generally refer to any speaker, including loudspeakers, headphone speakers, etc. One or more speakers may then playback the rendered speaker feeds 25.

Although described as rendering the speaker feeds 25 from the audio data 11', reference to rendering of the speaker feeds 25 may refer to other types of rendering, such as rendering incorporated directly into the decoding of the audio data 15 from the bitstream 21. An example of the alternative rendering can be found in Annex G of the MPEG-H 3D audio coding standard, where rendering occurs during the predominant signal formulation and the background signal formation prior to composition of the soundfield. As such, reference to rendering of the audio data 15 should be understood to refer to both rendering of the actual audio data 15 or decompositions or representations thereof of the audio data 15 (such as the above noted predominant audio signal, the ambient HOA coefficients, and/or the vector-based signal—which may also be referred to as a V-vector).

Figure 3:
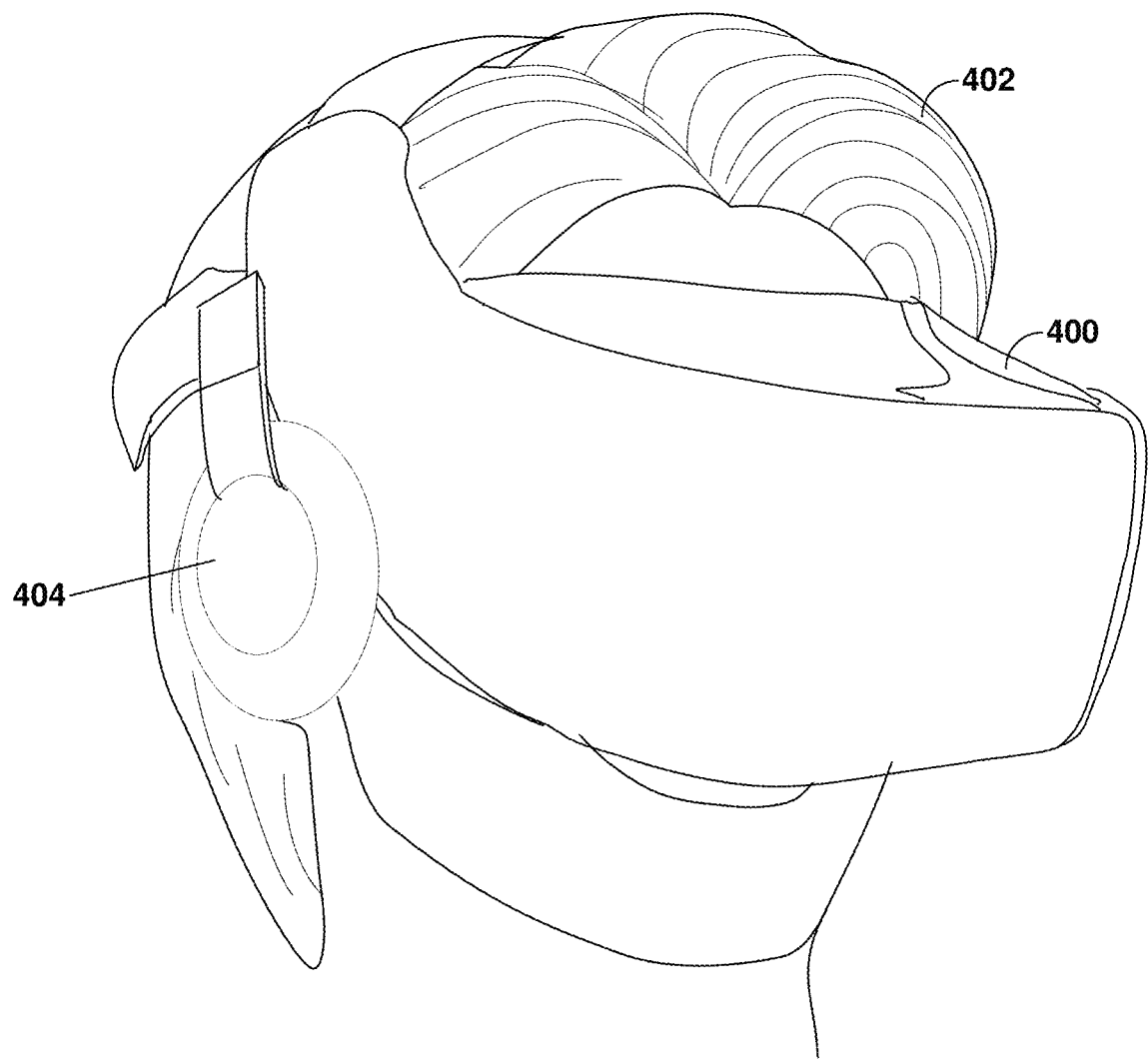
FIG. 3 is a diagram illustrating an example of a VR device worn by a user.

As described above, the content consumer device 14 may represent a VR device in which a human wearable display is mounted in front of the eyes of the user operating the VR device. FIG. 3 is a diagram illustrating an example of a VR device 400 worn by a user 402. The VR device 400 is coupled to, or otherwise includes, headphones 404, which may reproduce a soundfield represented by the audio data 11' through playback of the speaker feeds 25. The speaker feeds 25 may represent an analog or digital signal capable of causing a membrane within the transducers of headphones 404 to vibrate at various frequencies, where such process is commonly referred to as driving the headphones 404.

Video, audio, and other sensory data may play important roles in the VR experience. To participate in a VR experience, the user 402 may wear the VR device 400 (which may also be referred to as a VR headset 400) or other wearable electronic device. The VR client device (such as the VR headset 400) may track head movement of the user 402, and adapt the video data shown via the VR headset 400 to account for the head movements, providing an immersive experience in which the user 402 may experience a virtual world shown in the video data in visual three dimensions.

While VR (and other forms of AR and/or MR) may allow the user 402 to reside in the virtual world visually, often the VR headset 400 may lack the capability to place the user in the virtual world audibly. In other words, the VR system (which may include a computer responsible for rendering the video data and audio data—that is not shown in the example of FIG. 3 for ease of illustration purposes, and the VR headset 400) may be unable to support full three dimension immersion audibly.

Audio has conventionally provided a user with zero degrees of freedom (0 DOF), meaning that user movement does not change the audio rendering. VR, however, can provide users with some degrees of freedom, meaning the audio rendering can change based on user movement. The audio aspects of VR have been classified into three separate categories of immersion. The first category provides the lowest level of immersion and is referred to as three degrees of freedom (3DOF). 3DOF refers to audio rendering that accounts for movement of the head in the three degrees of freedom (yaw, pitch, and roll), thereby allowing the user to freely look around in any direction. 3DOF, however, cannot account for translational head movements in which the head is not centered on the optical and acoustical center of the soundfield.

The second category, referred to 3DOF plus (3DOF+), provides for the three degrees of freedom (yaw, pitch, and roll) in addition to limited spatial translational movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the three degrees of freedom in term of head movements (yaw, pitch, and roll) but also accounts for translation of the user in space (x, y, and z translations). The spatial translations may be induced by sensors tracking the location of the user in the physical world or by way of an input controller.

Figure 4:
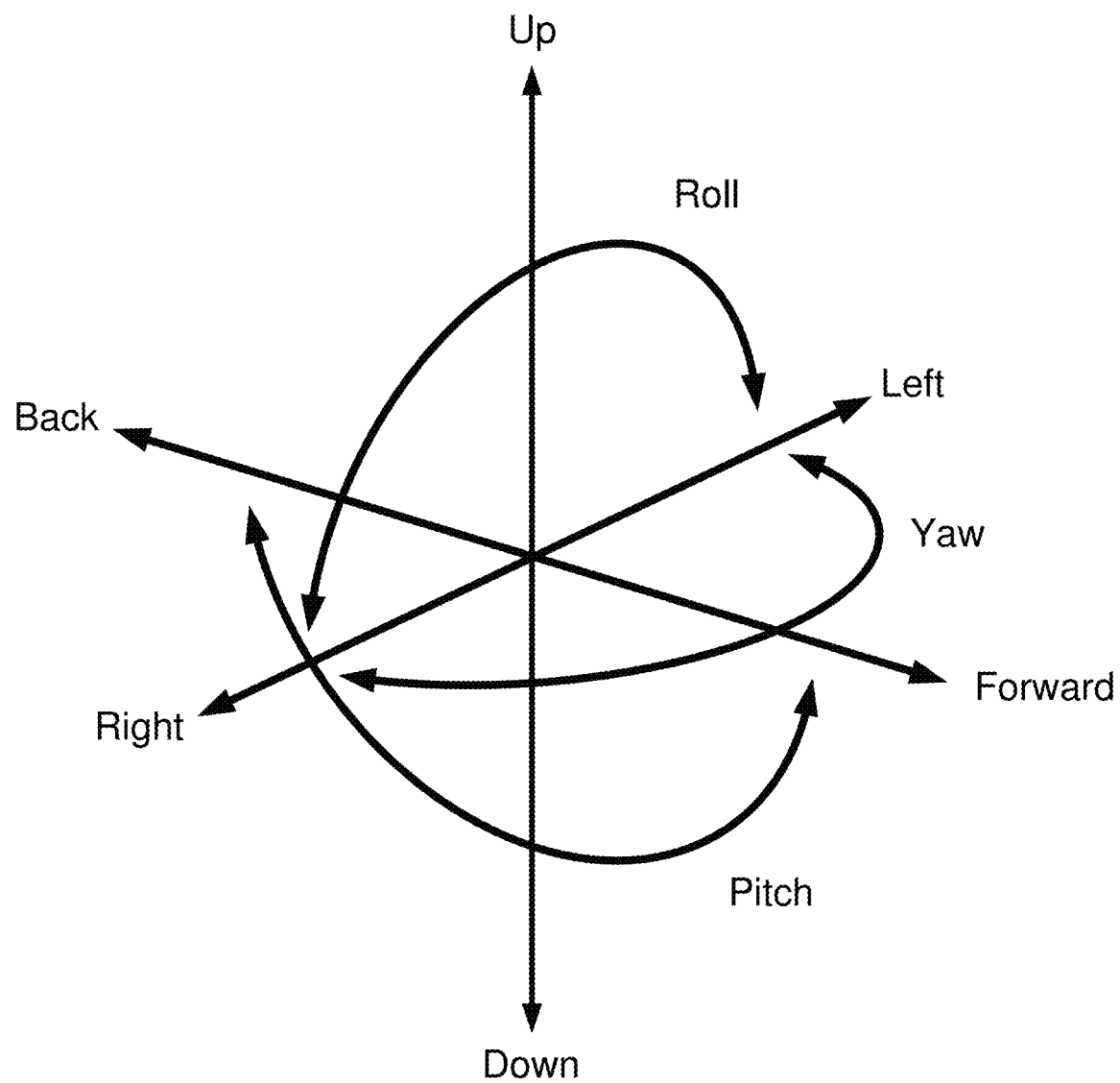
FIG. 4 is a diagram illustrating a six degree-of-freedom (6-DOF) head movement scheme.

FIG. 4 is a diagram illustrating a six degree-of-freedom (6-DOF) head movement scheme for AVR and/or AR applications. As shown in FIG. 4, the 6-DOF scheme includes three additional movement lines beyond the 3-DOF scheme. More specifically, the 6-DOF scheme of FIG. 4 includes, in addition to the rotation axes discussed above, three lines along which the user's head position may translationally move or actuate. The three translational directions are left-right (L/R), up-down (U/D), and forward-backward (F/B). An audio encoding device of source device 12 and/or the audio decoding device 24 may implement parallax handling to address the three translational directions. For instance, the audio decoding device 24 may apply one or more transmission factors to adjust the energies and/or directional information of various foreground audio objects to implement parallax adjustments based on the 6-DOF range of motion of a VR/AR user.

According to one example of this disclosure, source device 12 may generate audio data representative of a soundfield captured at a plurality of capture locations, metadata that enables the audio data to be rendered to support at least five degrees of freedom, and adaptation metadata that enables the audio data to be rendered to support fewer than five degrees of freedom. Content consumer device 14 may receive and store audio data representative of the soundfield captured at the plurality of capture locations, the metadata that enables the audio data to be rendered to support at least five degrees of freedom, and the adaptation metadata that enables the audio data to be rendered to support fewer than five degrees of freedom. Content consumer device 14 may adapt, based on the adaptation metadata, the audio data to provide fewer than five degrees of freedom, and audio renderers 22 may generate speaker feeds based on the adapted audio data.

According to another example of this disclosure, source device 12 may generate audio data representative of a soundfield captured at a plurality of capture locations, metadata that enables the audio data to be rendered to support six degrees of freedom, and adaptation metadata that enables the audio data to be rendered to support fewer than six degrees of freedom. Content consumer device 14 may receive and store audio data representative of the soundfield captured at the plurality of capture locations, the metadata that enables the audio data to be rendered to support six degrees of freedom, and the adaptation metadata that enables the audio data to be rendered to support fewer than six degrees of freedom. Content consumer device 14 may adapt, based on the adaptation metadata, the audio data to provide fewer than six degrees of freedom, and audio renderers 22 may generate speaker feeds based on the adapted audio data.

According to another example of this disclosure, content consumer device 14 may store audio data representative of a soundfield captured at a plurality of capture locations; determine a user location; adapt, based on the user location, the audio data to provide M degrees of freedom. wherein M comprise an integer value; and generate speaker feeds based on the adapted audio data. To determine the user location, content consumer device 14 may display a plurality of user locations and receive, from a user, an input indicative of one of the plurality of locations. To determine the user location, content consumer device 14 may display a trajectory; receive, from a user, an input indicative of a position on the trajectory; and select based on the position of the trajectory, one of a plurality of locations as the user location. To determine the user location, content consumer device 14 may detect a movement of a user and select a location based on the movement. Content consumer device 14 may select the location based on the movement from a plurality of locations.

According to another example of this disclosure, content consumer device 14 may store audio data representative of a soundfield captured at a plurality of capture locations; adapt the audio data to provide M degrees of freedom; generate speaker feeds based on the adapted audio data with the M degrees of freedom; adapt the audio data to provide N degrees of freedom; and generate speaker feeds based on the adapted audio data with the N degrees of freedom. Content consumer device 14 may be further configured to switch between generating speaker feeds based on the adapted audio data with the M degrees of freedom and the adapted audio data with the N degrees of freedom. Content consumer device 14 may, for example, perform such switching in response to a user input or a user movement.

Although described with respect to a VR device as shown in the example of FIG. 3, the techniques may be performed by other types of wearable devices, including watches (such as so-called "smart watches"), glasses (such as so-called "smart glasses"), headphones (including wireless headphones coupled via a wireless connection, or smart headphones coupled via wired or wireless connection), and any other type of wearable device. As such, the techniques may be performed by any type of wearable device by which a user may interact with the wearable device while worn by the user.

FIG. 2B is a block diagram illustrating another example system 100 configured to perform various aspects of the techniques described in this disclosure. The system 100 is similar to the system 10 shown in FIG. 2A, except that the audio renderers 22 shown in FIG. 2A are replaced with a binaural renderer 102 capable of performing binaural rendering using one or more HRTFs or the other functions capable of rendering to left and right speaker feeds 103.

The audio playback system 16 may output the left and right speaker feeds 103 to headphones 104, which may represent another example of a wearable device and which may be coupled to additional wearable devices to facilitate reproduction of the soundfield, such as a watch, the VR headset noted above, smart glasses, smart clothing, smart rings, smart bracelets or any other types of smart jewelry (including smart necklaces), and the like. The headphones 104 may couple wirelessly or via wired connection to the additional wearable devices.

Additionally, the headphones 104 may couple to the audio playback system 16 via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 104 may recreate, based on the left and right speaker feeds 103, the soundfield represented by the audio data 11. The headphones 104 may include a left headphone speaker and a right headphone speaker which are powered (or, in other words, driven) by the corresponding left and right speaker feeds 103.

Figure 5:
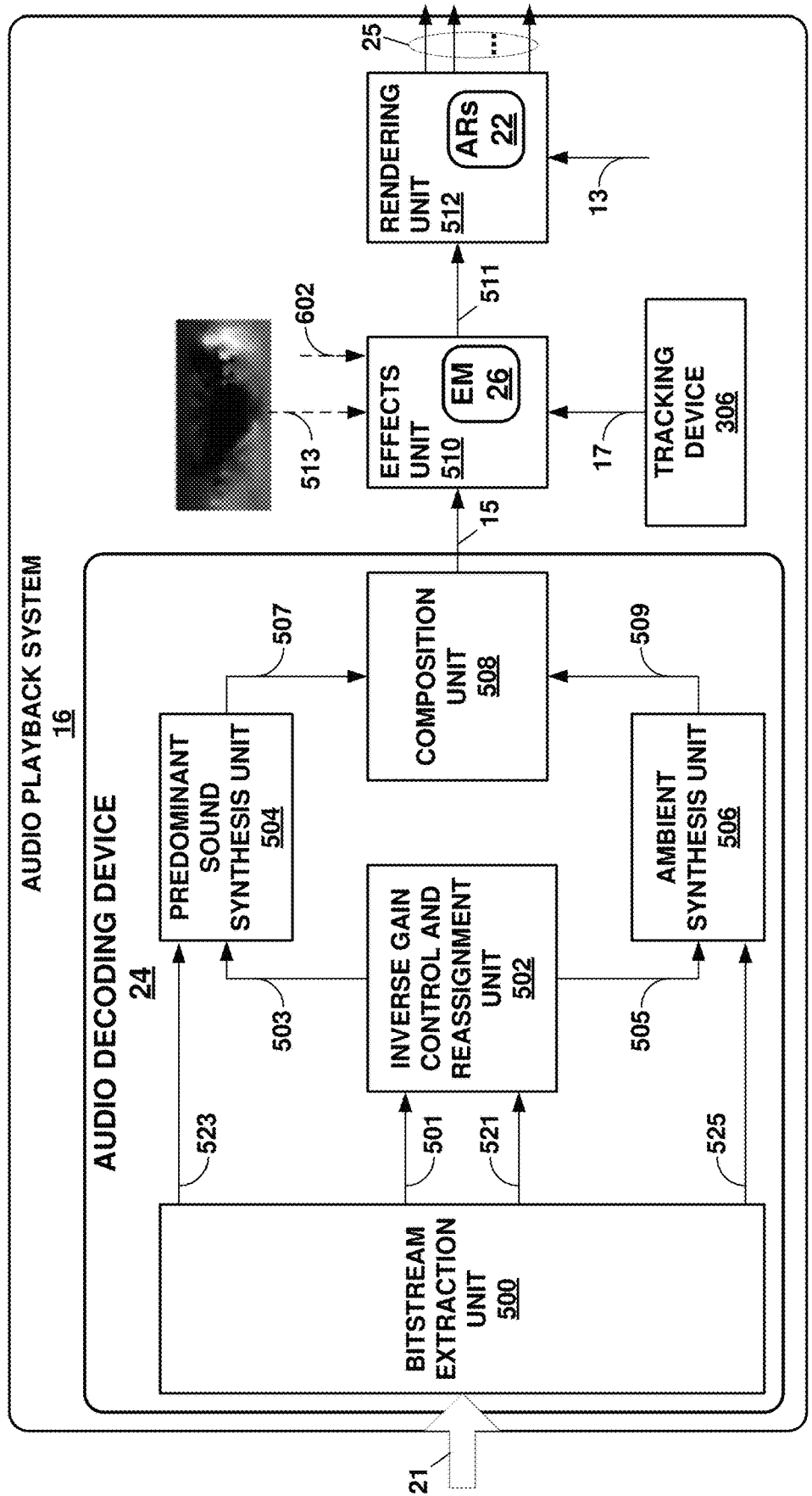
FIG. 5 is a block diagram illustrating in more detail the audio playback system shown in FIGS. 2A and 2B in performing various aspects of the effect techniques described in this disclosure.

FIG. 5 is a block diagram illustrating in more detail the audio playback system shown in FIGS. 2A and 2B. As shown in the example of FIG. 5, audio playback system 16 includes an effects unit 510 and a rendering unit 512 in addition to the above described audio decoding device 24. The effects unit 510 represents a unit configured to obtain the effects matrix 26 (shown as "EM 26" in the example of FIG. 5) described above. The rendering unit 512 represents a unit configured to determine and/or apply one or more of the audio renderers 22 (shown as "ARs 22" in the example of FIG. 5) described above.

The audio decoding device 24 may, as noted above, represent a unit configured to decode bitstream 21 in accordance with the MPEG-H 3D Audio Coding Standard. The audio decoding device 24 may include a bitstream extraction unit 500, an inverse gain control and reassignment unit 502, a predominant sound synthesis unit 504, an ambient synthesis unit 506, and a composition unit 508. More information concerning each of the foregoing units 500-508 can be found in the MPEG-H 3D Audio Coding Standard.

While described in detail in the MPEG-H 3D Audio Coding Standard, a brief description of each of the units 500-508 is provided below. The bitstream extraction unit 500 may represent a unit configured to extract decompositions of the audio data, along with other syntax elements or data required to compose a representation of the soundfield defined by the audio data 11. The bitstream extraction unit 500 may identify one or more transport channels 501 in the bitstream 11, each of which may specify either an ambient audio signal or a predominant audio signal. The bitstream extraction unit 500 may extract the transport channels 501 and output the transport channels 501 to the inverse gain control and reassignment unit 502.

Although not shown in the example of FIG. 5 for ease of illustration purposes, the audio decoding device 24 may include a psychoacoustic audio decoder that performs psychoacoustic audio decoding (e.g., advanced audio coding—AAC) with respect to the transport channels 501. Moreover, the audio decoding device 24 may include further units that perform various other operations not shown in the example of FIG. 5, such as fading between transport channels 501, and the like.

The bitstream extraction unit 500 may further extract side information 521 defining syntax elements and other data for performing gain control and assignment. The bitstream extraction unit 500 may output the side information 521 to inverse gain control and reassignment unit 502.

The bitstream extraction unit 500 may also extract side information 523 defining syntax elements and other data for performing predominant sound synthesis (including, a vector defining spatial characteristics—such as a width, direction, and/or shape—of a corresponding predominant audio signal defined in the transport channels 501). Additionally, the bitstream extraction unit 500 may extract side information 525 defining syntax elements and other data for performing ambient synthesis. The bitstream extraction unit 500 outputs the side information 523 to the predominant sound synthesis unit 504, and the side information 525 to the ambient synthesis unit 506.

The inverse gain control and reassignment unit 502 may represent a unit configured to perform, based on the side information 521, inverse gain control and reassignment with respect to the transport channels 501. The inverse gain control and reassignment unit 502 may determine, based on the side information 521, gain control information and apply the gain control information to each of the transport channels 501 to invert gain control applied at the audio encoding device implemented by the soundfield representation generation 302 in an effort to reduce dynamic range of the transport channels 501. The inverse gain control and reassignment unit 502 may next, based on the side information 523, determine whether each of the transport channels 501 specifies a predominant audio signal 503 or an ambient audio signal 505. The inverse gain control and reassignment unit 502 may output the predominant audio signals 503 to the predominant sound synthesis unit 504 and the ambient audio signals 505 to the ambient synthesis unit 506.

The predominant sound synthesis unit 504 may represent a unit configured to synthesize, based on the side information 523, predominant audio components of the soundfield represented by the audio data 11. The predominant sound synthesis unit 504 may multiply each of the predominant audio signals 503 by a corresponding spatial vector (which may also be referred to as a "vector-based signal") specified in the side information 523. The predominant sound synthesis unit 504 output, to composition unit 508, the result of the multiplication as predominant sound representation 507.

The ambient synthesis unit 506 may represent a unit configured to synthesize, based on the side information 525, ambient components of the soundfield represented by the audio data 11. The ambient synthesis unit 506 outputs, to composition unit 508, the result of the synthesis as ambient sound representation 509.

The composition unit 508 may represent a unit configured to compose, based on predominant sound representation 507 and the ambient sound representation 509, the audio data 15. The composition unit 508 may, in some examples, add the predominant sound representation 507 to the ambient sound representation 509 to obtain the audio data 15. The composition unit 508 may output the audio data 15 to the effects unit 510.

The effects unit 510 may represent a unit configured to perform various aspects of the effects techniques described in this disclosure to generate the EM 26 based on the translational distance 17, or as described in more detail below, the translational distance 17 and a depth map 513.

The depth map 513 shown in FIG. 5 was generated from a photograph. The whiter the area is in the depth map 513, the closer it was to the camera when the photograph was taken. The blacker the area is in the depth map 513, the further away it was from the camera when the photograph was taken. The effects unit 510 may apply EM 26 to the audio data 15 to obtain adapted audio data 511. The adapted audio data 511 may be adapted to provide the three degrees of freedom plus effects that accounts, in the soundfield, for the translational head movement indicated by the translational distance 17. The effects unit 510 may output the adapted audio data 511 to rendering unit 512.

The rendering unit 512 may represent a unit configured to apply one or more of ARs 22 to adapted audio data 511, and thereby obtain the speaker feeds 25. The rendering unit 512 may output the speaker feeds 25 to the headphones 404 shown in the example of FIG. 3.

Although described as separate units 510 and 512, the effects unit 510 may be incorporated within rendering unit 512, where the EM 26 is multiplied by the selected one of ARs 22 in the manner described below in more detail. The multiplication of the EM 26 by the selected one of ARs 22 may result in an updated AR (which may be denoted as "updated AR 22"). The rendering unit 512 may then apply the updated AR 22 to the audio data 15 to both adapt the audio data 15 to provide the 3DOF+ effect that accounts for the translational distance 17 and render the speaker feeds 25.

Figure 6:
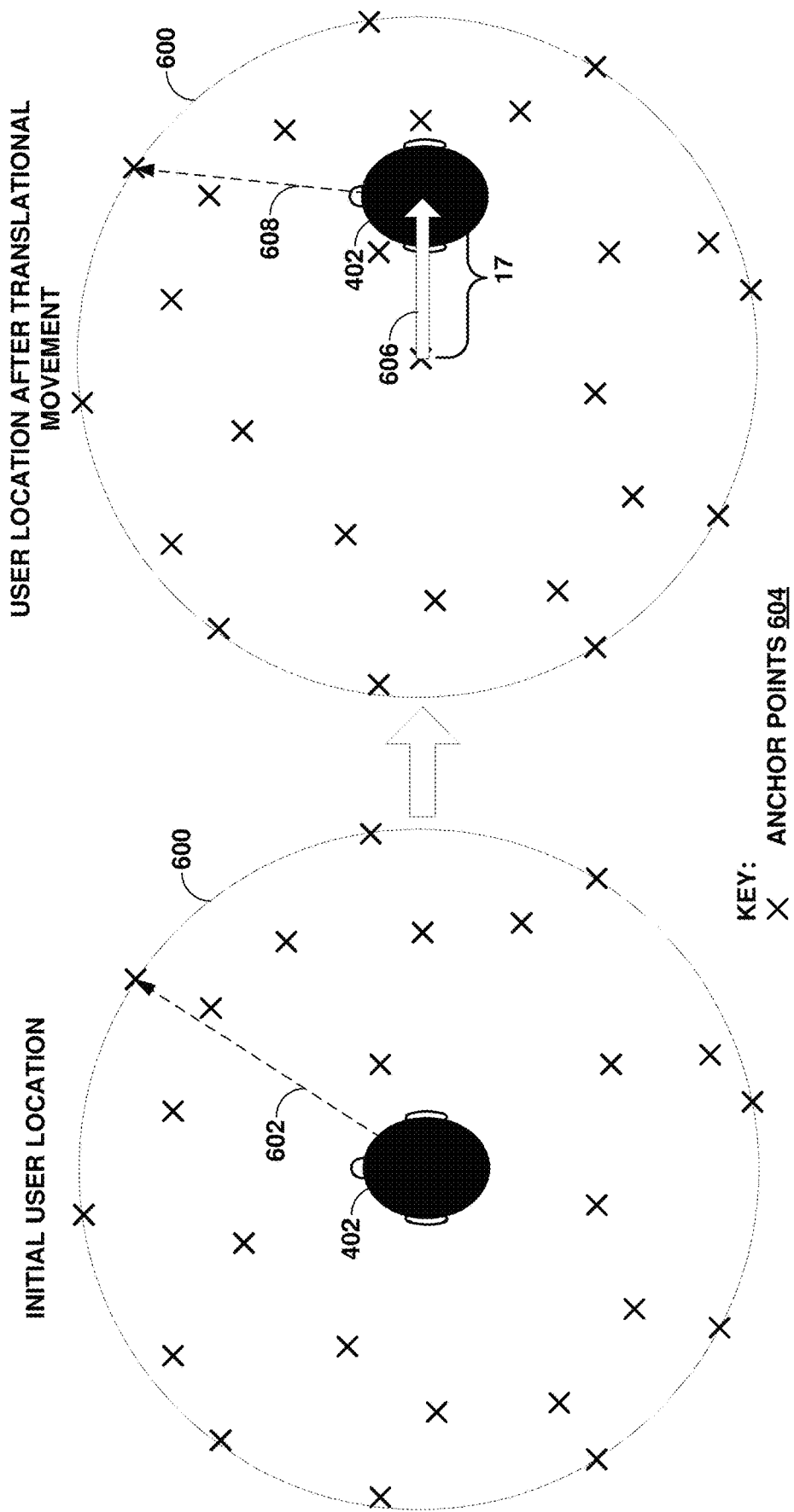
FIG. 6 is a diagram illustration in more detail how the effects unit shown in the example of FIG. 5 obtains the effects matrix in accordance with various aspects of the techniques described in this disclosure.

FIG. 6 is a diagram illustration in more detail how the effects unit shown in the example of FIG. 5 obtains the effects matrix in accordance with various aspects of the techniques described in this disclosure. As shown in the example of FIG. 6, the user 402 initially resides in the middle of recreated soundfield 600, as shown at the left of FIG. 6 denoted "INITIAL USER LOCATION." The recreated soundfield 600, while shown as a circle, is modeled as a sphere surrounding the user 402 at a reference distance 602. In some examples, the user 402 may input the reference distance 602 in configuring VR device 14 for playback of the audio data. In other examples, the reference distance 602 is static, or defined as a syntax element of the bitstream 21. When defined using the syntax element, the reference distance 602 may be static (such as sent a single time and therefore static for the duration of the experience) or dynamic (such as sent multiple times during the experience, e.g., per audio frame or per some periodic or non-periodic number of audio frames).

The effects unit 510 may receive the reference distance 602 and determine anchor points 604 positioned at the reference distance 602 from the head of the user 402 prior the translational head movement 606. The anchor points 604 are shown in the example of FIG. 6 as "X" marks. The effects unit 510 may determine the anchor points 604 as a plurality of uniformly distributed anchor points on a surface of the spherical soundfield 600 having a radius equal to the reference distance 602. In other examples, the anchor points may be determined by a camera (not shown) and may be provided to the effects unit 510.

The anchor points 604 may represent points of reference by which to determine translational head movement 606. The anchor points 604 may, in other words, represent reference points distributed about the spherical soundfield 600 by which the translational head movement 606 may be determined so as to adapt the soundfield. The anchor points 604 should not be confused with anchor points or key points as understood in visual image search algorithms. Again, the anchor points 604 may denote reference points at the reference distance from the head of user 402 used for determining the translational head movement 606 relative to each of the anchor points 604. The extent of the translational head movement 606 relative to each of the anchor points 604 may impact rendering with respect to the portion of the soundfield in which the respective one of the anchor points 604 resides. As such, the anchor points 604 may also represent soundfield sampling points by which to determine translational head movement 606 and adapt, based on the relative translational head movement 606, rendering of the soundfield.

In any event, the user 402 may then perform the translational head movement 606, moving, as shown in the example of FIG. 6 under the heading "USER LOCATION AFTER TRANSLATIONAL MOVEMENT," the head the translational distance 17 to the right. The effects unit 510 may determine, after the translational head movement 606, an updated distance 608 relative to each of the plurality of anchor points 604. Although only a single updated distance 608 is shown in the example of FIG. 6, the effects unit 510 may determine an updated distance 608 relative to each of the anchor points 604. The effects unit 510 may next determine, based on each of the updated distances 608, the EM 26.

The effects unit 510 may compute a distant-dependent loudness adjustment (in the form of the EM 26) for each translated anchor point. The computation for each reference point may be denoted as $g_l$, where the original reference distance 602 is denoted as $dist_{ref}$ and the updated distance 608 may be denoted as $dist_{new,l}$. For each of the anchor points 604, the effects unit 510 may compute $g_l$ using the equation $$g_l = \left(\frac{dist_{ref}}{dist_{new,l}}\right)^{distPow}.$$

The distPow parameter may control the effect strength, which may be input by the user 402 to control the magnitude of the effect strength. While described as being a variable subject to control by the user 402, the distPow parameter may also be specified by the content creator either dynamically or statically.

Mathematically, the soundfield 600 surrounding the user 402 may be represented as M equidistant anchor points 604 (which may also be referred to as "spatial points 604") on a sphere with a center located at the head of the user 402. The variable 'M' is typically selected such that M is greater than or equal to $(N+1)^2$, where N denotes the greatest order associated with the audio data 15.

The M equidistant spatial points 604 result in M spatial directions extending from the head of the user 402 to each of the M equidistant spatial points 604. The M spatial directions may be represented by $\boxtimes_{m,m}$. The effects unit 510 may obtain the EM 26 that is applied to the rendering matrix based on the M spatial directions, $\boxtimes_{m,m}$. In one example, the effects unit 510 obtains EM 26 computed from HOA coefficients associated with each of the M spatial directions. The effects unit 510 may then perform loudness compensation for each of spatial direction l=1 ... M, which is applied to the EM 26 to generate the compensated EM 26. While described as being M equidistant spatial point 604, the points 604 may also be non-equidistant or, in other words, distributed about the sphere in a non-uniform manner.

In terms of the variables used by the MPEG-H 3D Audio Coding Standard, Annex F.1.5 of the "DIS" version, when discussing, as one example, loudness compensation, the effects unit 510 may compute EM 26 from HOA coefficients associated with the M spatial directions as follows:

$$\tilde{F} = (\Psi^{(O,M)^T})\dagger(\Psi_m^{(O,M)^T})$$

with $\Psi^{(O,M)^T} := [S_1^O \, S_2^O \, \ldots \, S_M^O] \in \mathbb{R}^{O \times M}$ The "†" symbol may denote the pseudo-inverse matrix operation.

The effect unit 510 may then perform the loudness compensation for each spatial direction l=1 ... M, which is applied for the matrix F according to the following:

$$A(l) = \frac{(RS_{m_l}^O)^T (RS_{m_l}^O)}{(R\tilde{F}S_l^U)^T (R\tilde{F}S_l^U)} * g_l$$

where $F = (\Psi^{(O,M)^T})\dagger \text{diag}(A)(\Psi_m^{(O,M)^T})$.

The effect unit 510 may then multiple the selected one of AR 22, denoted below by the variable "R" by the EM 26, denoted above and below by the variable "F" to generate the updated AR 22 discussed above and denoted as follows by the variable "D."

$$D = RF$$

The foregoing may, when distance-dependent loudness adjustment is disabled, mathematically represent the distance-independent loudness adjustment by removal of the multiplication by $g_i$, resulting in the following:

$$A(l) = \sqrt{\frac{(RS^O_{m_l})^T(RS^O_{m_l})}{(RFS^U_l)^T(RFS^U_l)}}$$

In all other respects, the mathematic representation is unchanged when distance-independent loudness adjustment is enabled (or, in other words, when distance-dependent loudness adjustment is disabled).

In this way, the effects unit 510 may provide the EM 26 to rendering unit 512, which multiplies the audio renderer 22 that converts the audio data 15 from the spherical harmonic domain to the spatial domain speaker signals 25 (which in this case may be a binaural render that renders the audio data to binaural audio headphone speaker signals) by the compensated EM 26 to create an adapted spatial rendering matrix (which is referred to herein as the "updated AR 22") capable of accounting for both the three degrees of freedom and the translation head movement 606.

In some instances, the effects unit 510 may determine multiple EMs 26. For example, the effects unit 510 may determine a first EM 26 for a first frequency range, a second EM 26 for a second frequency range, etc. The frequency ranges of the first EM 26 and the second EM 26 may overlap, or may not overlap (or, in other words, may be distinct from one another). As such, the techniques described in this disclosure should not be limited to the single EM 26, but should include application of multiple EMs 26, including, but not limited to, the example multiple frequency dependent EMs 26.

As discussed above, the effects unit 510 may also determine EM 26 based on translational distance 17 and the depth map 513. The bitstream 21 may include video data corresponding to the audio data 16, where such video data is synchronized with the audio data 16 (using, e.g., frame synchronization information). Although not shown in the example of FIGS. 2-4, the client consumer device 14 may include a video playback system that decodes the corresponding bitstream providing the video data, which may include depth maps, such as the depth map 513. As mentioned above, the depth map 513 provides a gray scale representation of the 360 degree virtual reality scene, where black represents a very far distance, and white represents a near distance with the various shades of gray indicated intermediate distances between black and white.

The video decoding device of the video playback system may utilize the depth map 513 to formulate a view for either the left eye or the right eye from the respective right eye view or left eye view specified in the video bitstream. The video decoding device may alter the amount of lateral distance between the right eye view and the left eye view based on the depth map, scaling the lateral distance smaller based on the darker the shade of grey. As such, near objects denoted in white or light shades of gray in the depth map 513 may have a larger lateral distance between the left and right eye views, while far objects denoted in black or darker shades of gray in the depth map 513 may have a smaller lateral distance between the left and right eye view (thereby more closing resembling a far off point).

Figure 7:
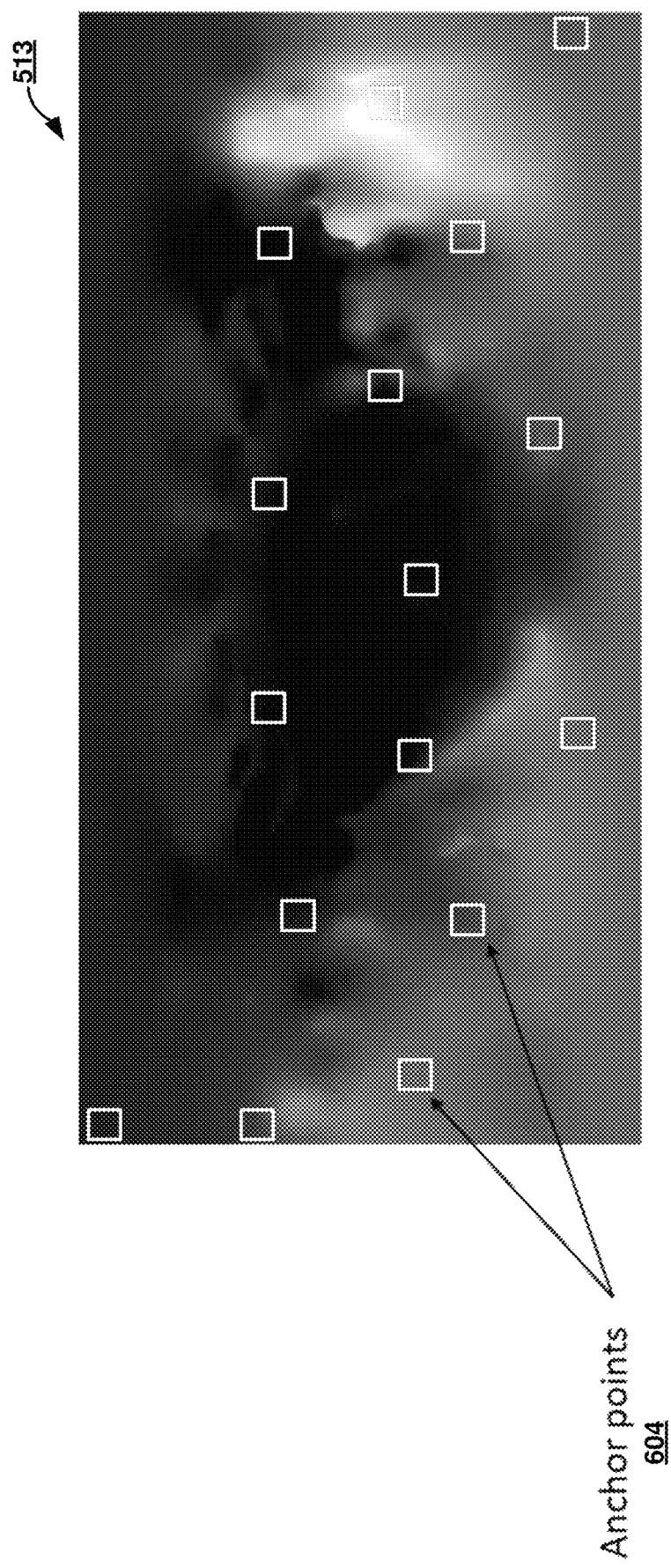
FIG. 7 is a diagram illustrating the depth map shown in FIG. 5 having been updated to reflect the mapping of the anchor points to the depth map in accordance with various aspects of the techniques described in this disclosure.

The effects unit 510 may utilize the depth information provided by the depth map 513 to adapt the location of the anchor points 604 relative to the head of the user 402. That is, the effects unit 510 may map the anchor points 604 to the depth map 513, and utilize the depth information of the depth map 513 at the mapped locations within the depth map 513 to identify a more accurate reference distance 602 for each of the anchor points 604. FIG. 7 is a diagram illustrating the depth map shown in FIG. 5 having been updated to reflect the mapping of the anchor points to the depth map in accordance with various aspects of the techniques described in this disclosure.

In this respect, instead of assuming a single reference distance 602, the effects unit 510 may utilize the depth map 513 to estimate individual references distances 602 for each of the anchor points 604. As such, the effects unit 510 may determine the updated distance 608 relative to each of the individually determined reference distances 602 of the anchor points 604.

While described as performed with respect to a gray-scale depth map 513, the techniques may be performed with respect to other types of information providing depth information, such as a color image, color or gray-scale stereo images, infrared camera images, etc. The techniques may, in other words, be performed with respect to any type of information providing depth information of a scene associated with the corresponding audio data 15.

Figure 8:
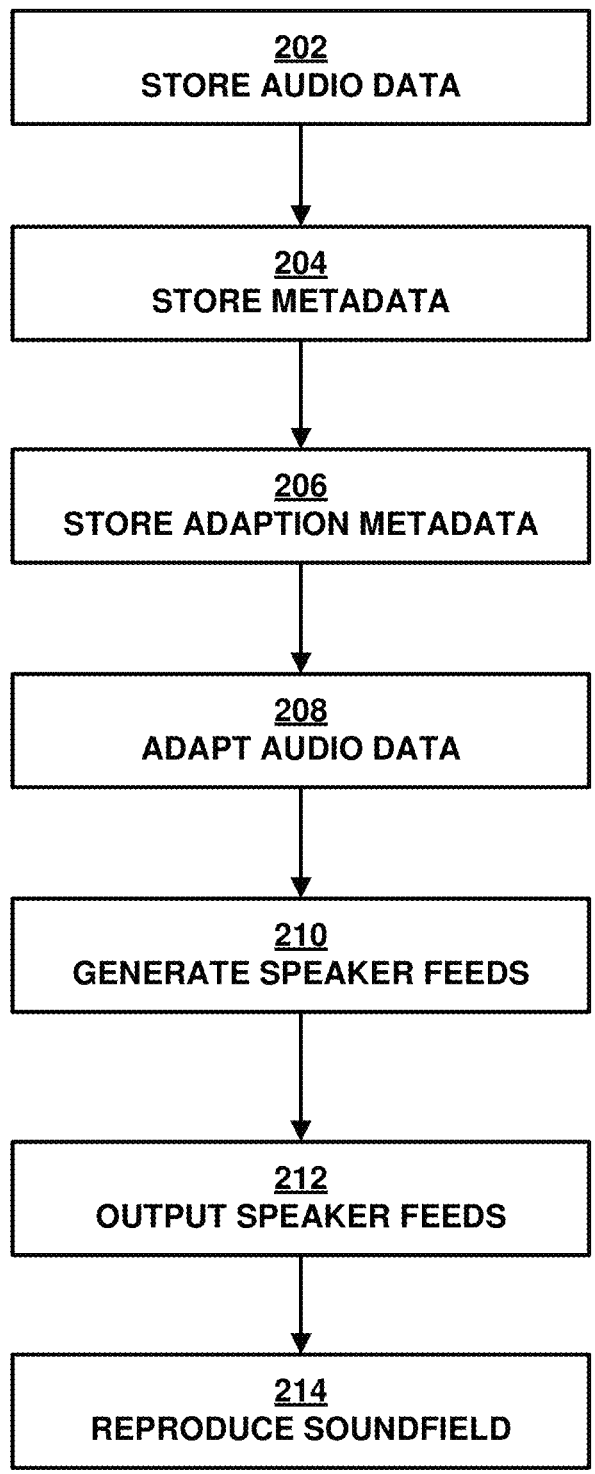
FIG. 8 is a flow diagram depicting techniques in accordance with the present disclosure

FIG. 8 is a flow diagram depicting techniques in accordance with the present disclosure. The audio playback system 16 may receive the bitstream 21 and may store audio data contained therein in memory (202). The audio playback system 16 may also store metadata contained in the bitstream 21 in memory (204). Additionally, the audio playback system 16 may store adaption metadata in memory (206). For example, the adaptation metadata may include one or more of a user location and a user orientation. In some examples, certain adaptation metadata, such as the user location and user orientation are contained in the bitstream 21. In other examples, the user location and user orientation are not contained in the bitstream 21, but are received by user input.

The audio playback system 16 may then adapt the audio data (208) based on the adaptation metadata. For example, the audio playback system 16 may adapt the audio data to provide fewer degrees of freedom than the source device 12 created. In some examples, the audio playback system 16 may apply an effects matrix, such as effects matrix 26, to the audio data when adapting the audio data. In some examples, the audio playback system 16 may determine the effects matrix based upon the user location. In some examples, the audio playback system 16 may multiply the effects matrix 26 by a rendering matrix to obtain an updated rendering matrix. In some examples, the audio playback system 16 may obtain a rotation indication indicative of a rotational head movement of the user 402 and may adapt the audio data based upon the rotational indication and the adaptation metadata.

The audio playback system 16 may generate speaker feeds from the adapted audio data (210). The speaker feeds may be configured for use with headphones, loudspeakers or any other type of speaker. In some examples, the audio playback system 16 may apply the updated rendering matrix to the audio data to generate the speaker feeds. In some examples the audio playback system 16 may apply a binaural render to adapted higher order ambisonic audio data to generate the speaker feeds.

In some examples, the audio playback system 16 may output the speaker feeds (212) to speakers. In some examples the audio playback system may reproduce a soundfield (214) on one or more speakers, such as headphones or one or more loudspeakers.

Figure 9:
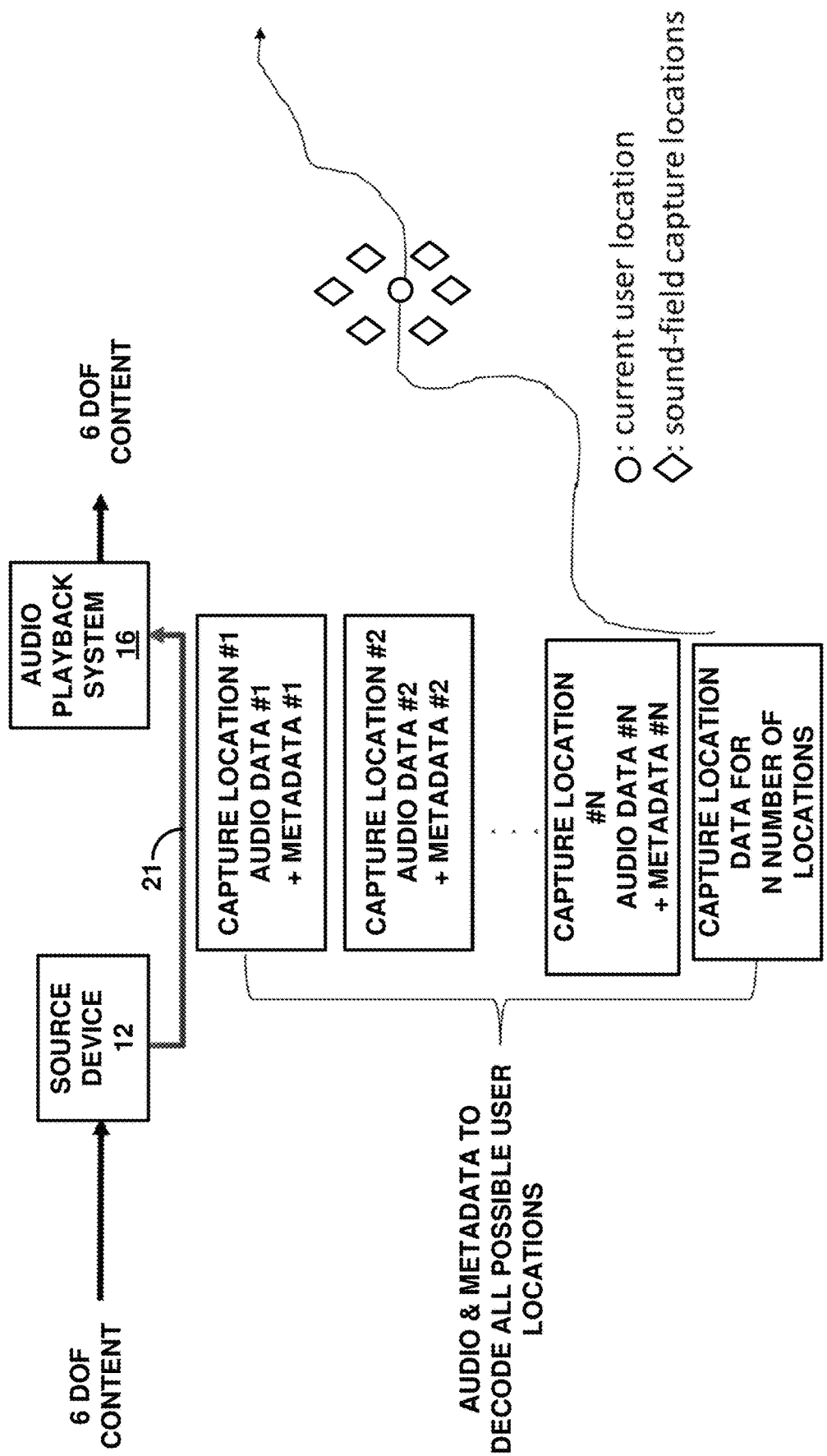
FIG. 9 is a diagram showing how the systems of FIGS. 2A and 2B may process audio data.

FIG. 9 is a diagram showing how the systems of FIGS. 2A and 2B may process audio data. In the example of FIG. 9, the source device 12 encodes 6DOF content and transmits bitstream 21, which includes the 6DOF content, to audio playback system 16. In the example of FIG. 9, the audio playback system 16 supports 6DOF content, and therefore, renders the 6DOF content and generates speaker feeds based on the 6DOF content. The user may consume the 6DOF content utilizing all 6DOF movements, meaning the user can freely move in a 3D space. Bitstream 21 includes audio and metadata to decode all possible user locations.

FIGS. 5, 6, 7, and 9 have described an example implementation of audio playback system 16 that supports 3DOF+ and 6DOF rendering. FIGS. 10-13, however, describe an example implementation of audio playback system 16 that either does not support 3DOF+ and 6DOF rendering or that has such functionality disabled.

Figure 10:
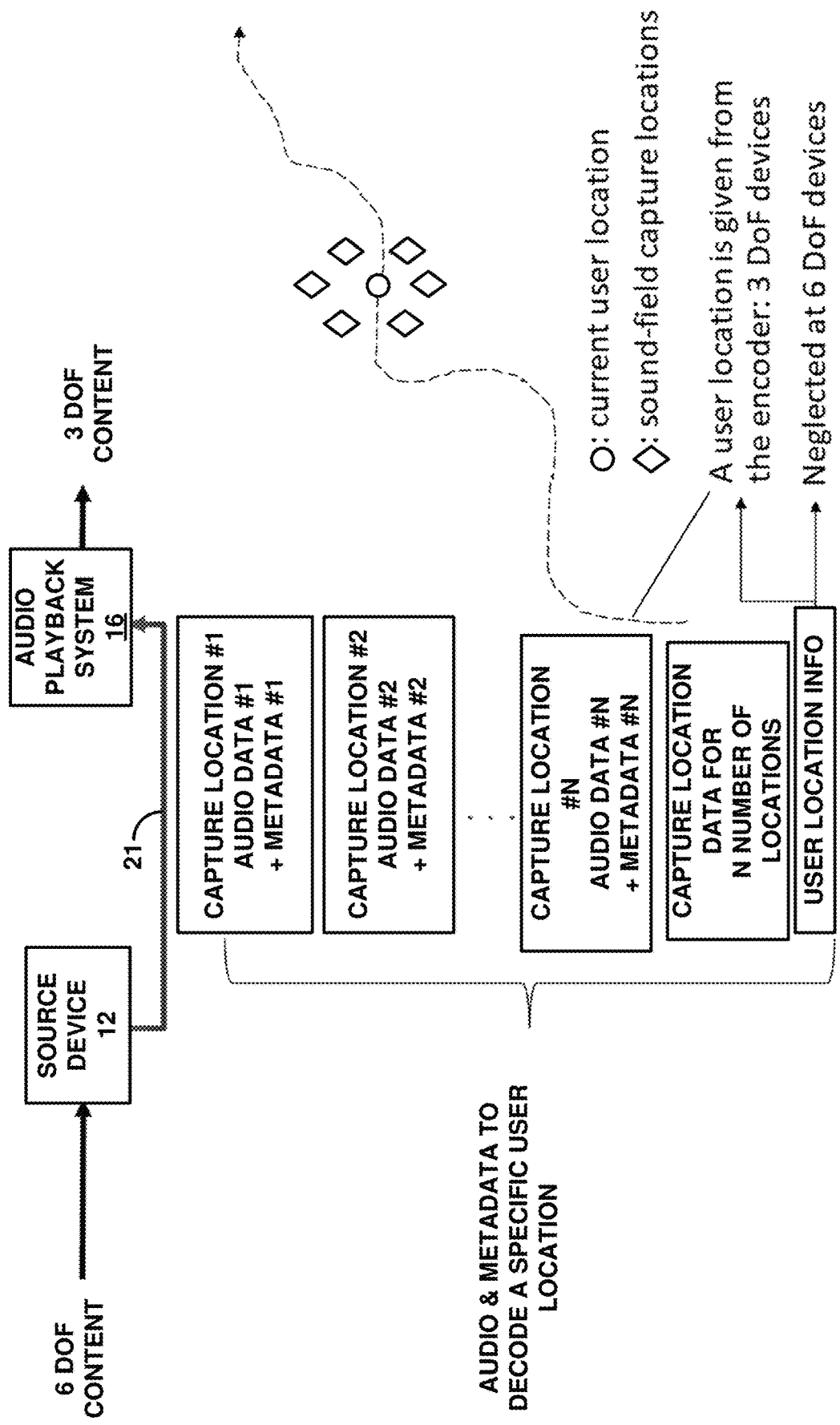
FIG. 10 is a diagram illustrating how the systems of FIGS. 2A and 2B may process audio data in accordance with the techniques of this disclosure.

FIG. 10 is a diagram illustrating how the systems of FIGS. 2A and 2B may process audio data in accordance with the techniques of this disclosure. In the example of FIG. 10, the source device 12 encodes 6DOF content and transmits bitstream 21, which includes the 6DOF content, to audio playback system 16. In the example of FIG. 10, the audio playback system 16 only supports 3DOF content. The audio playback system 16, therefore, adapts the 6DOF content to 3DOF content and generates speaker feeds based on the 3DOF content. The user may consume the 3DOF content utilizing 3DOF movements (e.g., changes to pitch, yaw, and roll), meaning the user cannot move translationally but can move rotationally.

In the example of FIG. 10, bitstream 21 includes audio and metadata to decode all possible user locations. The bitstream 21 also includes adaptation metadata that includes user location information. The audio playback system 16, which is being assumed not to support 6DOF content in the example of FIG. 10, uses the user location information to adapt the 6DOF content to provide 3DOF and generate speaker feeds based on the adapted audio data. When processed by a device that supports 6DOF, the device can ignore the adaptation metadata that includes user location information, meaning such information may not be needed by a device that supports 6DOF.

Figure 11:
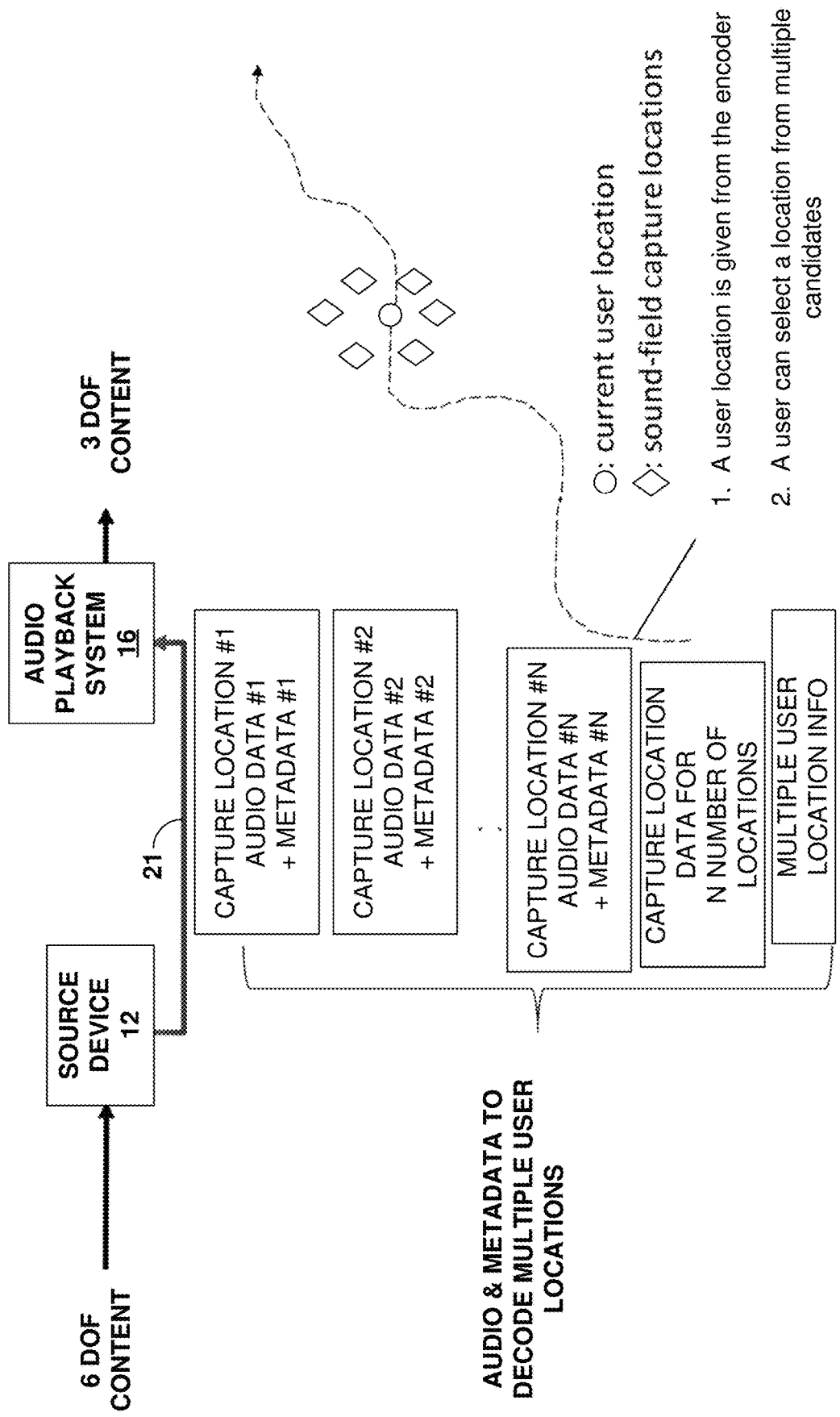
FIG. 11 is a diagram illustrating how the systems of FIGS. 2A and 2B may process audio data in accordance with the techniques of this disclosure.

FIG. 11 is a diagram illustrating how the systems of FIGS. 2A and 2B may process audio data in accordance with the techniques of this disclosure. In the example of FIG. 11, the source device 12 encodes 6DOF content and transmits bitstream 21, which includes the 6DOF content, to audio playback system 16. In the example of FIG. 11, the audio playback system 16 only supports 3DOF content. The audio playback system 16, therefore, adapts the 6DOF content to 3DOF content and generates speaker feeds based on the adapted 3DOF content. The user may consume the 3DOF content utilizing 3DOF movements (e.g., changes to pitch, yaw, and roll), meaning the user cannot move translationally but can move rotationally.

In the example of FIG. 11, bitstream 21 includes audio and metadata to decode all possible user locations. The bitstream 21 also includes adaptation metadata that includes user location information for multiple locations. The audio playback system 16, which is being assumed not to support 6DOF content in the example of FIG. 11, uses user location information from one of the multiple locations to adapt the 6DOF content to provide 3DOF content. A user of audio playback system 16 may select one of the multiple locations, and audio playback system 16 may adapt the 6DOF content to 3DOF content based on the user location information of the selected location. When processed by a device that supports 6DOF, the device can ignore the adaptation metadata that includes the user location information for the multiple locations, meaning such information may not be needed by a device that supports 6DOF.

Figure 12:
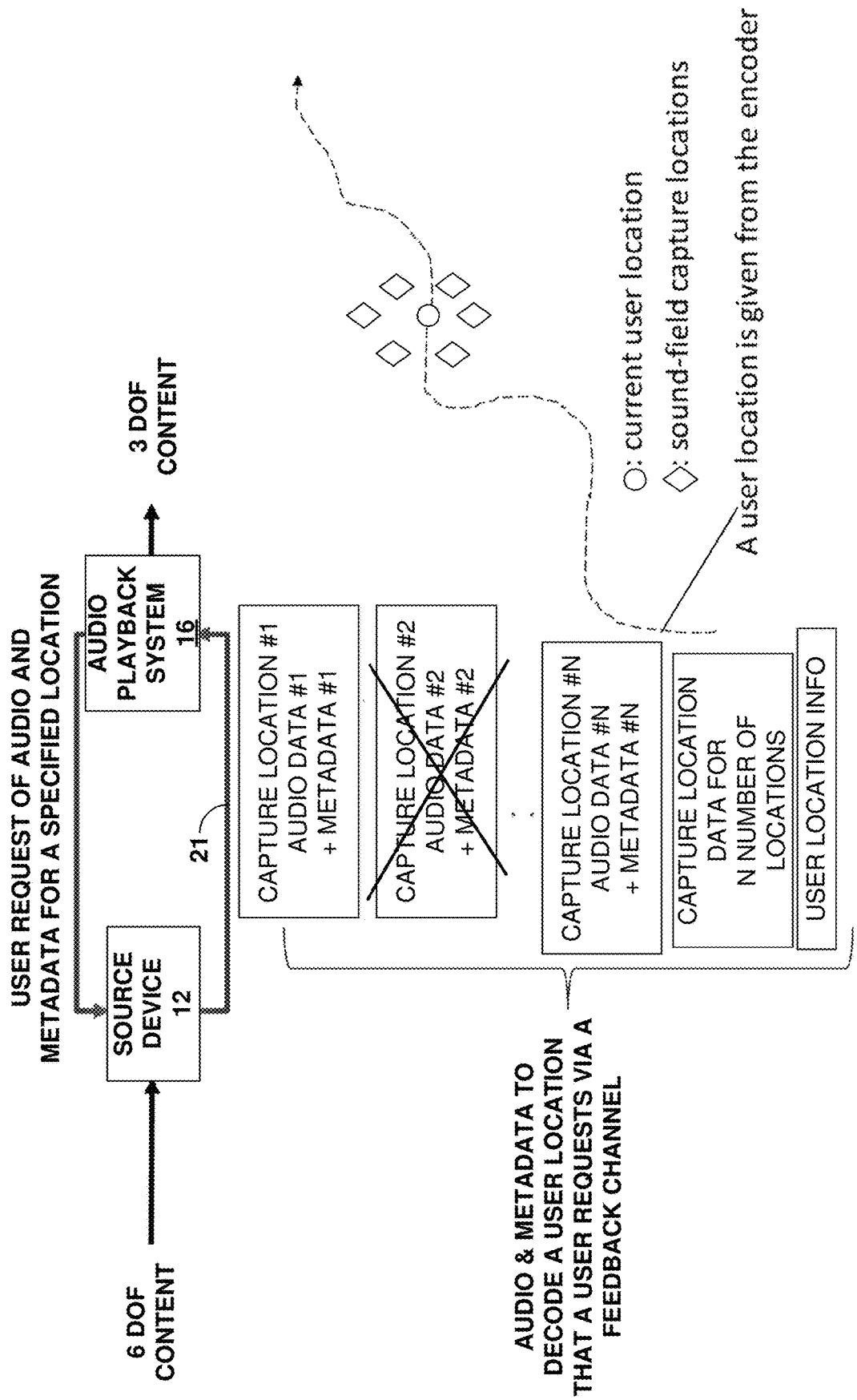
FIG. 12 is a diagram illustrating how the systems of FIGS. 2A and 2B may process audio data in accordance with the techniques of this disclosure.

FIG. 12 is a diagram illustrating how the systems of FIGS. 2A and 2B may process audio data in accordance with the techniques of this disclosure. In the example of FIG. 12, the source device 12 encodes 6DOF content and transmits bitstream 21, which includes the 6DOF content, to audio playback system 16. In the example of FIG. 12, the audio playback system 16 only supports 3DOF content. The audio playback system 16, therefore, adapts the 6DOF content to 3DOF content and generates speaker feeds based on the 3DOF content. The user may consume the 3DOF content utilizing 3DOF movements (e.g., changes to pitch, yaw, and roll), meaning the user cannot move translationally but can move rotationally.

In the example of FIG. 12, a user of audio playback system 16 may select a location from a plurality of locations, and audio playback system 16 may transmit the user selection to source device 12. Based on the user selection, source device 12 may generate bitstream 21 such that bitstream 21 does not include audio and metadata for decoding all possible user locations. In the example of FIG. 12, bitstream 21 may, for example, include audio and metadata to decode the user location selected by the user. The bitstream 21 also includes adaptation metadata that includes user location information for the selected user location. The audio playback system 16, which is being assumed not to support 6DOF content in the example of FIG. 12, uses the user location information to adapt the 6DOF content to provide 3DOF and generates speaker feeds based on the adapted audio data.

Figure 13:
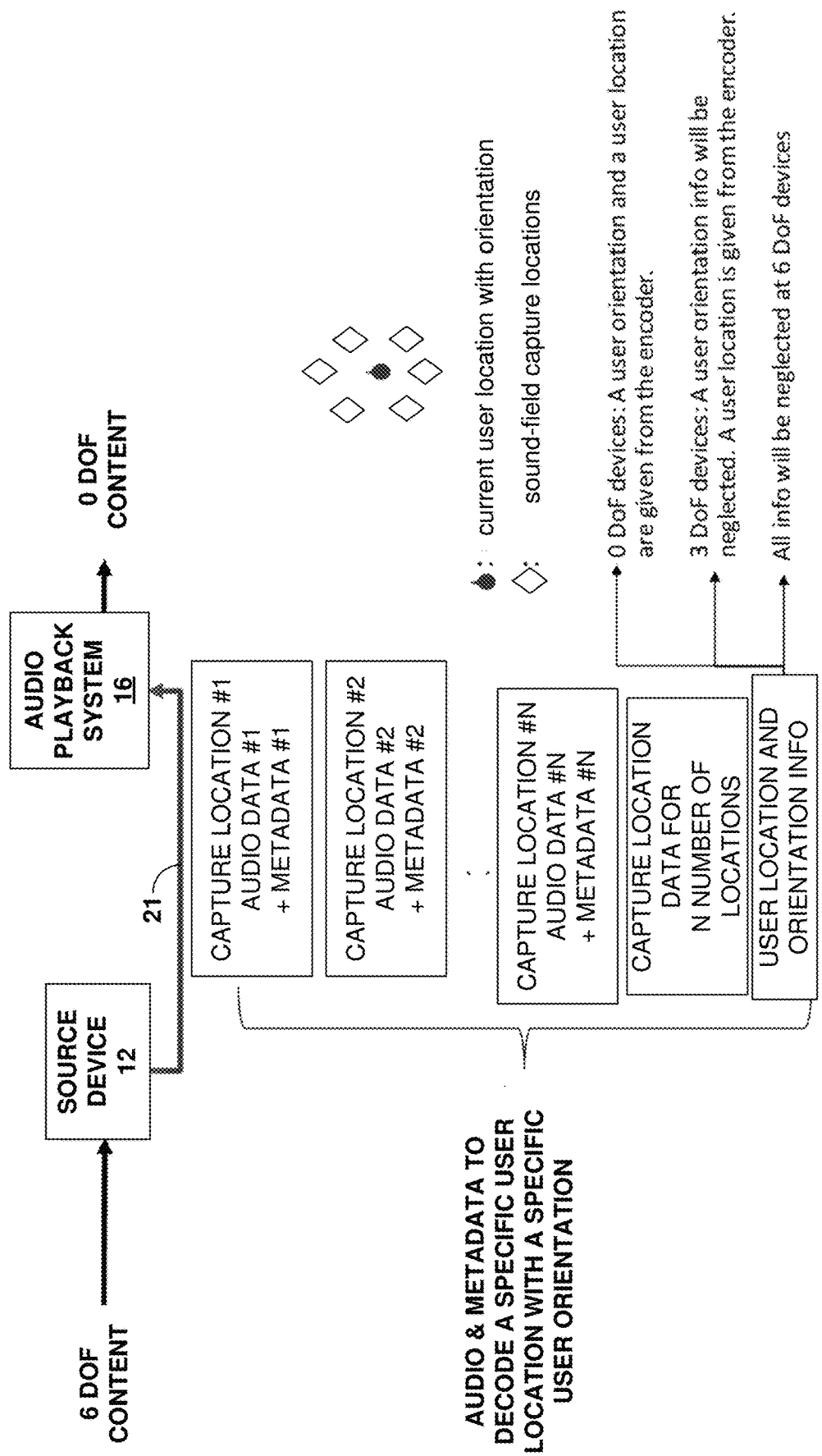
FIG. 13 is a diagram illustrating how the systems of FIGS. 2A and 2B may process audio data in accordance with the techniques of this disclosure.

FIG. 13 is a diagram illustrating how the systems of FIGS. 2A and 2B may process audio data in accordance with the techniques of this disclosure. In the example of FIG. 13, the source device 12 encodes 6DOF content and transmits bitstream 21, which includes the 6DOF content, to audio playback system 16. In the example of FIG. 13, the audio playback system 16 only supports 0DOF content. The audio playback system 16, therefore, adapts the 6DOF content to 0DOF content and generates speaker feeds based on the 0DOF content. The user may consume the 0DOF content without using any of the 6DOF movements, meaning the user cannot move either rotationally or translationally.

In the example of FIG. 13, bitstream 21 includes audio and metadata to decode all possible user locations. The bitstream 21 also includes adaptation metadata that includes user location information and user orientation information. The audio playback system 16, which is being assumed not to support 6DOF content in the example of FIG. 13, uses the user location information to adapt the 6DOF content to provide 0DOF and generate speaker feeds based on the adapted audio data. When processed by a device that supports 6DOF, the device can ignore the adaptation metadata that includes the user location information and the user orientation information, meaning such information may not be needed by a device that supports 6DOF. When processed by a device that supports 3DOF, the device can adapt the 6DOF content to 3DOF based on the user location but ignore the user orientation information.

Figure 14:
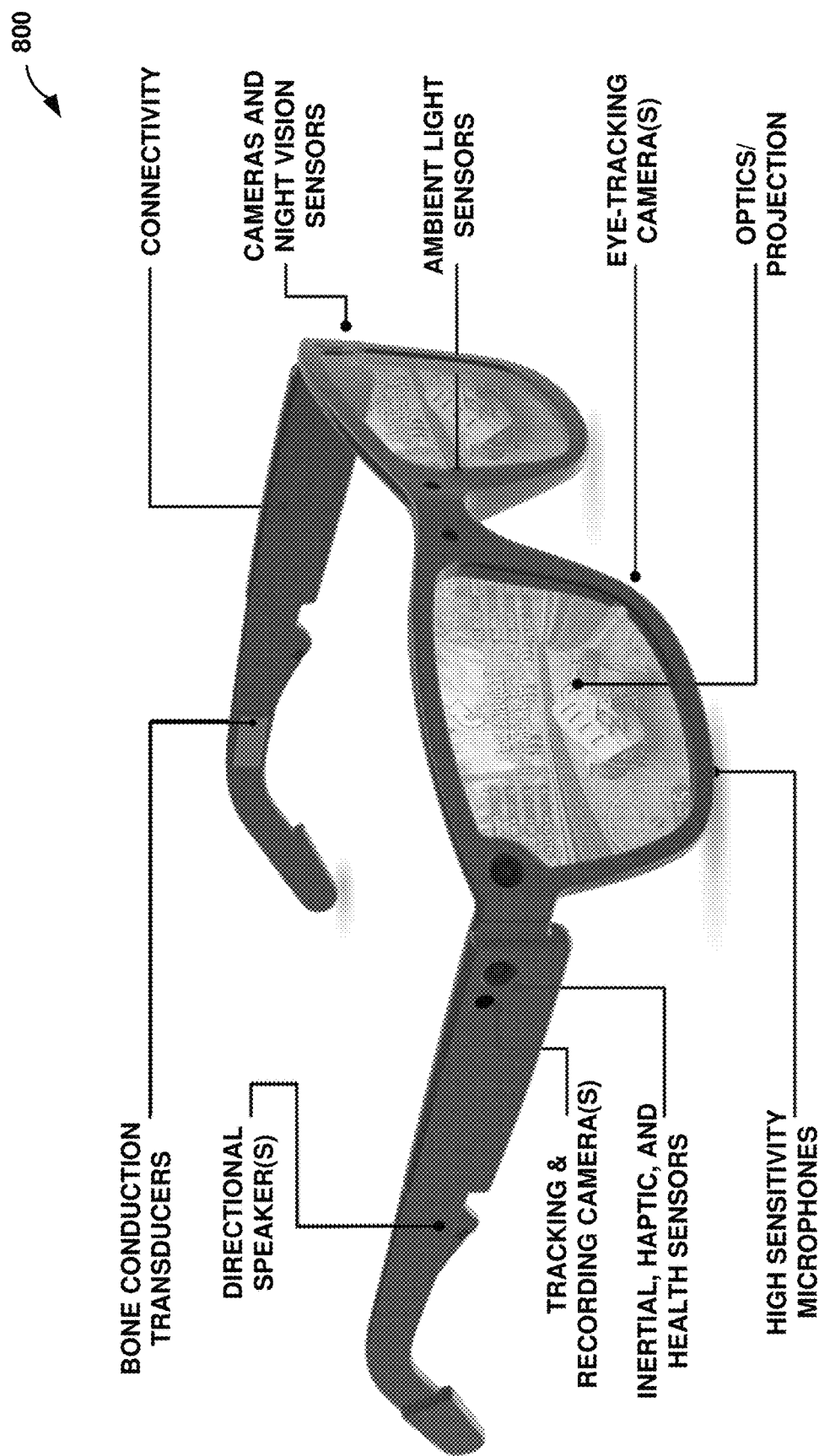
FIG. 14 is a diagram illustrating an example of a wearable device that may operate in accordance with various aspect of the techniques described in this disclosure.

FIG. 14 is a diagram illustrating an example of a wearable device 800 that may operate in accordance with various aspect of the techniques described in this disclosure. In various examples, the wearable device 800 may represent a VR headset (such as the VR headset 400 described above), an AR headset, an MR headset, or an extended reality (XR)

headset. Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D elements and part photographed real elements are combined into an immersive experience that simulates the user's physical presence in the environment. Extended Reality "XR" may refer to a catchall term for VR, AR, and MR. More information regarding terminology for XR can be found in a document by Jason Peterson, entitled "Virtual Reality, Augmented Reality, and Mixed Reality Definitions," and dated Jul. 7, 2017.

The wearable device 800 may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 800 may communicate with the computing device supporting the wearable device 800 via a wired connection or a wireless connection.

In some instances, the computing device supporting the wearable device 800 may be integrated within the wearable device 800 and as such, the wearable device 800 may be considered as the same device as the computing device supporting the wearable device 800. In other instances, the wearable device 800 may communicate with a separate computing device that may support the wearable device 800. In this respect, the term "supporting" should not be understood to require a separate dedicated device but that one or more processors configured to perform various aspects of the techniques described in this disclosure may be integrated within the wearable device 800 or integrated within a computing device separate from the wearable device 800.

For example, when the wearable device 800 represents the VR device 400, a separate dedicated computing device (such as a personal computer including the one or more processors) may render the audio and visual content, while the wearable device 800 may determine the translational head movement upon which the dedicated computing device may render, based on the translational head movement, the audio content (as the speaker feeds) in accordance with various aspects of the techniques described in this disclosure. As another example, when the wearable device 800 represents smart glasses, the wearable device 800 may include the one or more processors that both determine the translational head movement (by interfacing within one or more sensors of the wearable device 800) and render, based on the determined translational head movement, the speaker feeds.

As shown, the wearable device 800 includes a rear camera, one or more directional speakers, one or more tracking and/or recording cameras, and one or more light-emitting diode (LED) lights. In some examples, the LED light(s) may be referred to as "ultra bright" LED light(s). In addition, the wearable device 800 includes one or more eye-tracking cameras, high sensitivity audio microphones, and optics/projection hardware. The optics/projection hardware of the wearable device 800 may include durable semi-transparent display technology and hardware.

The wearable device 800 also includes connectivity hardware, which may represent one or more network interfaces that support multimode connectivity, such as 4G communications, 5G communications, etc. The wearable device 800 also includes ambient light sensors, and bone conduction transducers. In some instances, the wearable device 800 may also include one or more passive and/or active cameras with fisheye lenses and/or telephoto lenses. Various devices of this disclosure, such as the content consumer device 14 of FIG. 2A may use the steering angle of the wearable device 800 to select an audio representation of a soundfield (e.g., one of MOA representations) to output via the directional speaker(s)—headphones 404—of the wearable device 800, in accordance with various techniques of this disclosure. It will be appreciated that the wearable device 800 may exhibit a variety of different form factors.

Furthermore, the tracking and recording cameras and other sensors may facilitate the determination of translational distance 606. Although not shown in the example of FIG. 14, wearable device 800 may include the above discussed MEMS or other types of sensors for detecting translational distance 606.

Although described with respect to particular examples of wearable devices, such as the VR device 400 discussed above with respect to the examples of FIG. 3 and other devices set forth in the examples of FIGS. 2A and 2B, a person of ordinary skill in the art would appreciate that descriptions related to FIGS. 2A-3 may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure.

Figure 15A:
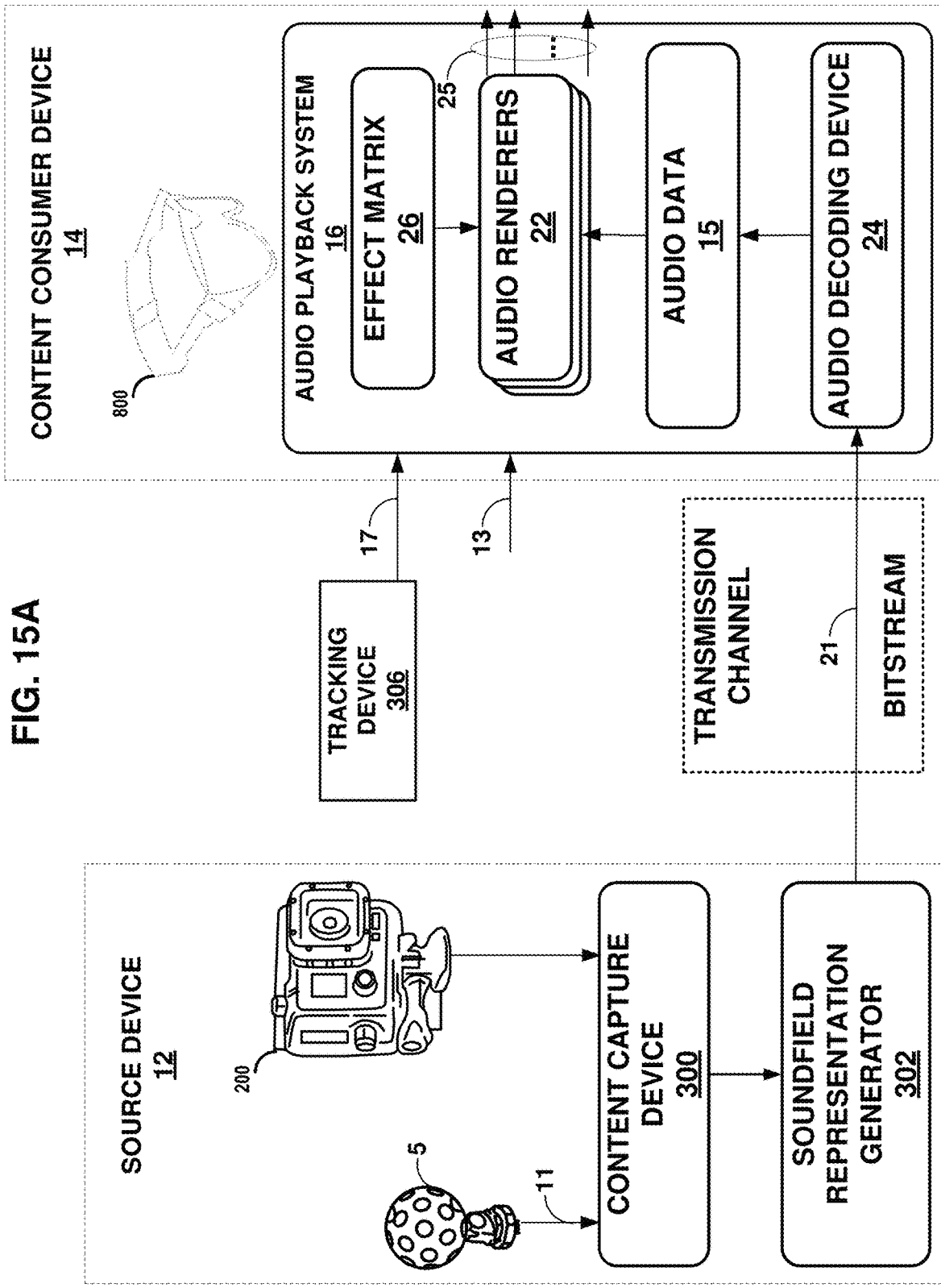
FIGS. 15A and 15B are diagrams illustrating other example systems that may perform various aspects of the techniques described in this disclosure.
Figure 15B:
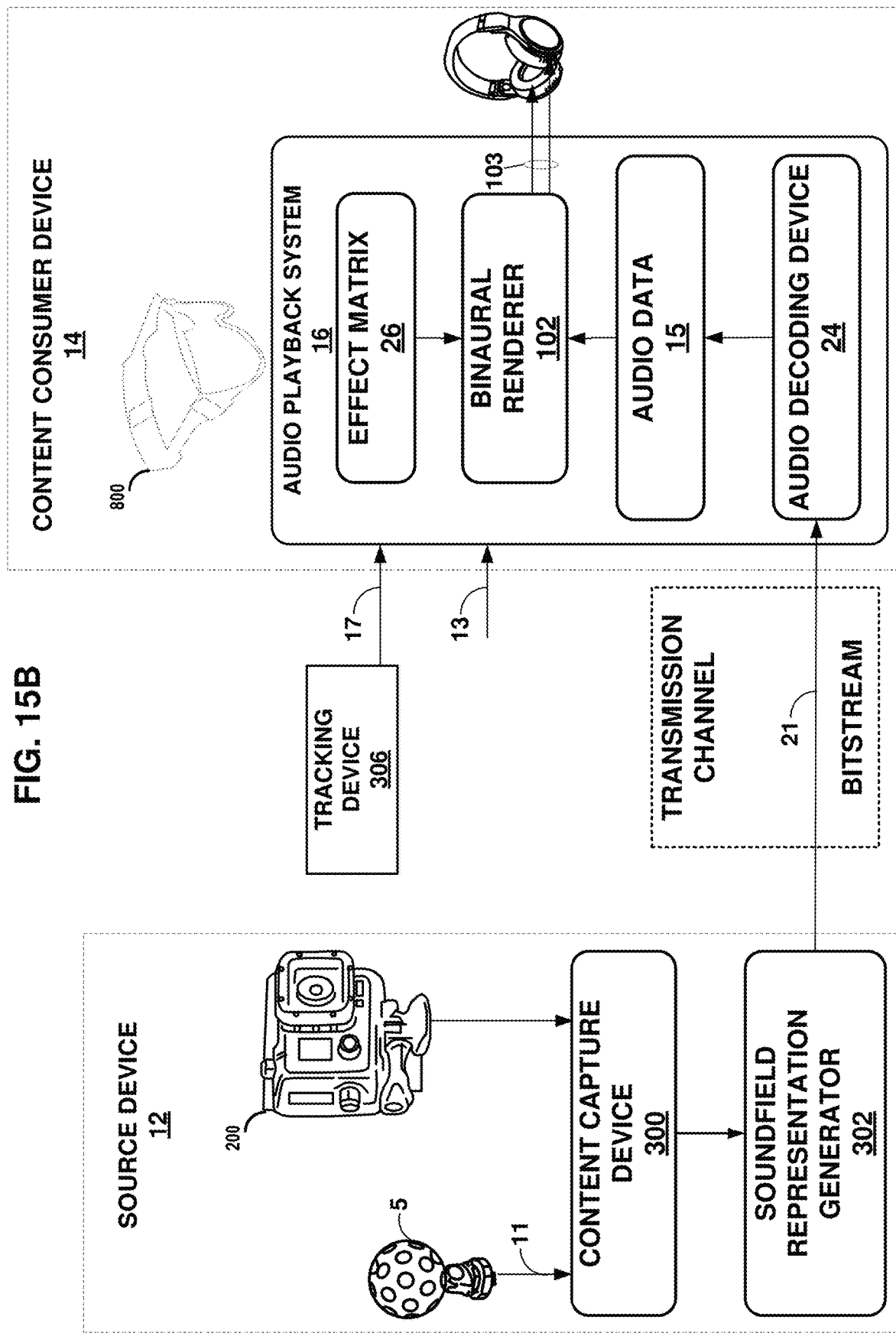

FIGS. 15A and 15B are diagrams illustrating example systems that may perform various aspects of the techniques described in this disclosure. FIG. 15A illustrates an example in which the source device 12 further includes a camera 200. The camera 200 may be configured to capture video data and provide the captured raw video data to the content capture device 300. The content capture device 300 may provide the video data to another component of the source device 12, for further processing into viewport-divided portions.

In the example of FIG. 15A, the content consumer device 14 also includes the wearable device 800. It will be understood that, in various implementations, the wearable device 800 may be included in, or externally coupled to, the content consumer device 14. As discussed above with respect to FIG. 14, the wearable device 800 includes display hardware and speaker hardware for outputting video data (e.g., as associated with various viewports) and for rendering audio data.

FIG. 15B illustrates an example similar that illustrated by FIG. 15A, except that the audio renderers 22 shown in FIG. 15A are replaced with a binaural renderer 102 capable of performing binaural rendering using one or more HRTFs or the other functions capable of rendering to left and right speaker feeds 103. The audio playback system 16 may output the left and right speaker feeds 103 to headphones 104.

The headphones 104 may couple to the audio playback system 16 via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 104 may recreate, based on the left and right speaker feeds 103, the soundfield represented by the audio data. The headphones 104 may include a left headphone speaker and a right headphone speaker which are powered (or, in other words, driven) by the corresponding left and right speaker feeds 103.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video pacts, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A device comprising:
a memory configured to store audio data representative of a soundfield captured at a plurality of capture locations, metadata that enables the audio data to be rendered to support N degrees of freedom, and adaptation metadata that enables the audio data to be rendered to support M degrees of freedom, wherein N is a first integer number and M is a second integer number that is different than the first integer number; and
one or more processors coupled to the memory, and configured to:
  determine a user location by receiving, from a user, an input indicative of one of a plurality of locations or indicative of a position on a trajectory;
adapt, based on the adaptation metadata, the audio data to provide the M degrees of freedom; and generate speaker feeds based on the adapted audio data.

2. The device of claim 1, wherein N=6 and M is less than N.

3. The device of claim 1, further comprising a display device configured to display a plurality of user locations or a trajectory.

4. The device of claim 1, wherein to determine the user location, the one or more processors are configured to:
select based on the position of the trajectory, one of a plurality of locations as the user location.

5. The device of claim 2, wherein the 6 degrees of freedom comprise yaw, pitch, roll, and translational distance defined in either a two-dimensional spatial coordinate space or a three-dimensional spatial coordinate space.

6. The device of claim 1, wherein the adaptation metadata includes the user location and a user orientation, and wherein the one or more processors are configured to adapt, based on the user location and the user orientation, the audio data to provide zero degrees of freedom.

7. The device of claim 1, wherein the adaptation metadata includes the user location, and wherein the one or more processors are configured to:
determine, based on the user location, an effects matrix that provides the M degrees of freedom; and
apply the effects matrix to the audio data to adapt the soundfield.

8. The device of claim 1, wherein the one or more processors are further configured to store the user location to the memory as the adaptation metadata.

9. The device of claim 1, wherein the one or more processors are further configured to obtain a bitstream that specifies the adaptation metadata, the adaptation metadata including the user location associated the audio data.

10. The device of claim 1, wherein the one or more processors are further configured to obtain a rotation indication indicative of a rotational head movement of the user interfacing with the device, and wherein the one or more processors are further configured to adapt, based on the rotation indication and the adaptation metadata, the audio data to provide three degrees of freedom.

11. The device of claim 1, wherein the one or more processors are coupled to speakers of a wearable device, wherein the one or more processors are configured to apply a binaural renderer to adapted higher order ambisonic audio data to generate the speaker feeds, and wherein the one or more processors are further configured to output the speaker feeds to the speakers.

12. The device of claim 1, wherein the audio data comprises higher order ambisonic coefficients associated with spherical basis functions having an order of one or less, higher order ambisonic coefficients associated with spherical basis functions having a mixed order and suborder, or higher order ambisonic coefficients associated with spherical basis functions having an order greater than one.

13. The device of claim 1, wherein the audio data comprises one or more audio objects.

14. The device of claim 1, further comprising:
one or more speakers configured to reproduce, based on the speaker feeds, a soundfield.

15. The device of claim 1, wherein the one or more processors comprise processing circuitry.

16. The device of claim 15, wherein the processing circuitry comprises one or more application specific integrated circuits.

17. A method comprising:
storing audio data representative of a soundfield captured at a plurality of capture locations;
storing metadata that enables the audio data to be rendered to support N degrees of freedom;
storing adaptation metadata that enables the audio data to be rendered to support M degrees of freedom, wherein N is a first integer number and M is a second integer number that is different than the first integer number;
receiving, from a user, an input indicative of one of a plurality of user locations or indicative of a position on a trajectory;
determining a user location based on the input;
adapting, based on the adaptation metadata, the audio data to provide the M degrees of freedom; and
generating speaker feeds based on the adapted audio data.

18. A device comprising:
means for storing audio data representative of a soundfield captured at a plurality of capture locations;
means for storing metadata that enables the audio data to be rendered to support N degrees of freedom;
means for storing adaptation metadata that enables the audio data to be rendered to support M degrees of freedom, wherein N is a first integer number and M is a second integer number that is different than the first integer number;
means for receiving, from a user, an input indicative of one of a plurality of user locations or indicative of a position on a trajectory;
means for determining a user location based on the input;
means for adapting, based on the adaptation metadata, the audio data to provide the M degrees of freedom; and
means for generating speaker feeds based on the adapted audio data.

19. The device of claim 7, wherein the M degrees of freedom includes three degrees of freedom, the three degrees of freedom comprising yaw, pitch, and roll.

20. The device of claim 7, wherein M=0.

21. The device of claim 13, wherein the one or more processors are further configured to multiply the effects matrix by a rendering matrix to obtain an updated rendering matrix, and wherein the one or more processors are further configured to apply the updated rendering matrix to the audio data to:
provide the M degrees of freedom; and
generate the speaker feeds.

22. The device of claim 14, wherein the wearable device comprises a watch, glasses, headphones, an augmented reality (AR) headset, a virtual reality (VR) headset, or an extended reality (XR) headset.

23. The device of claim 17, wherein the device is one of a vehicle, unmanned vehicle, a robot, or a handset.

* * * * *